(12) United States Patent
Barcaru et al.

(10) Patent No.: US 12,166,669 B2
(45) Date of Patent: Dec. 10, 2024

(54) MULTI-CAST REDISTRIBUTION AND REMAP FOR MULTI-AREA NETWORKS

(71) Applicant: Extreme Networks, Inc., San Jose, CA (US)

(72) Inventors: Constantin Barcaru, Bucharest (RO); Gautam Khera, Sugar Land, TX (US); Irina Maria Militaru, Bucharest (RO)

(73) Assignee: Extreme Networks, Inc., San Jose, CA (US)

( * ) Notice: Subject to any disclaimer, the term of this patent is extended or adjusted under 35 U.S.C. 154(b) by 147 days.

(21) Appl. No.: 17/168,954

(22) Filed: Feb. 5, 2021

(65) Prior Publication Data
US 2022/0255852 A1    Aug. 11, 2022

(51) Int. Cl.
| | |
|---|---|
| *H04L 45/302* | (2022.01) |
| *H04L 12/18* | (2006.01) |
| *H04L 12/46* | (2006.01) |
| *H04L 45/02* | (2022.01) |
| *H04L 45/16* | (2022.01) |
| H04L 101/622 | (2022.01) |

(52) U.S. Cl.
CPC ......... *H04L 45/302* (2013.01); *H04L 12/18* (2013.01); *H04L 12/4633* (2013.01); *H04L 45/02* (2013.01); *H04L 45/16* (2013.01); *H04L 2101/622* (2022.05)

(58) Field of Classification Search
CPC ... H04L 45/302; H04L 12/18; H04L 12/4633; H04L 45/02; H04L 45/16; H04L 2101/622; H04L 45/72; H04W 88/182; H04W 16/10; H04W 40/22; H04W 16/16; H04W 28/18
See application file for complete search history.

(56) References Cited

U.S. PATENT DOCUMENTS

| | | | |
|---|---|---|---|
| 8,144,576 B2 * | 3/2012 | Saltsidis | H04L 41/0654 370/221 |
| 8,416,789 B1 * | 4/2013 | Busch | H04L 12/4658 370/401 |
| 9,385,942 B2 | 7/2016 | Grosser, Jr. et al. | |
| 9,838,310 B1 | 12/2017 | Sajassi et al. | |
| 10,033,636 B1 | 7/2018 | Zhang et al. | |

(Continued)

OTHER PUBLICATIONS

International Search Report and Written Opinion of the International Searching Authority directed to related International Patent Application No. PCT/US2022/015070, mailed May 9, 2022; 10 pages.

(Continued)

*Primary Examiner* — Joseph L Greene
(74) *Attorney, Agent, or Firm* — Sterne, Kessler, Goldstein & Fox P.L.L.C.

(57) ABSTRACT

Provided herein are systems and methods for managing redistribution and remapping of multicast services between networks in a multi-area network. Multicast streams can be sent through networks from a source node towards a boundary node. The boundary node can receive the multicast stream, remap a source node identifier and service instance identifier, and forward the multicast stream into a second network. The boundary node can receive a route for the multicast stream. The route can be installed in a link-state database and can be used to send the multicast stream through the multi-area network from the source node to a destination node.

20 Claims, 23 Drawing Sheets

(56) References Cited

U.S. PATENT DOCUMENTS

| | | |
|---|---|---|
| 10,291,532 B1 | 5/2019 | Tiruveedhula et al. |
| 10,523,466 B1 | 12/2019 | Sivaraj et al. |
| 2007/0076719 A1 | 4/2007 | Allan et al. |
| 2008/0144644 A1 | 6/2008 | Allan et al. |
| 2009/0144403 A1 | 6/2009 | Sajassi et al. |
| 2010/0020797 A1 | 1/2010 | Casey et al. |
| 2011/0317703 A1 | 12/2011 | Dunbar et al. |
| 2012/0188990 A1 | 7/2012 | Bottorff |
| 2013/0011132 A1 | 1/2013 | Blair |
| 2013/0195111 A1 | 8/2013 | Allan et al. |
| 2013/0259465 A1 | 10/2013 | Blair |
| 2013/0286817 A1 | 10/2013 | Allan |
| 2014/0006358 A1* | 1/2014 | Wang ............. G06F 16/21 707/687 |
| 2014/0301244 A1* | 10/2014 | Allan ............. H04L 41/12 370/254 |
| 2014/0351477 A1* | 11/2014 | Lee ............. G06F 1/1632 710/303 |
| 2016/0028586 A1 | 1/2016 | Blair |
| 2016/0127271 A1 | 5/2016 | Yasuda |
| 2017/0201389 A1 | 7/2017 | Tiruveedhula et al. |
| 2017/0250904 A1 | 8/2017 | Singarayan et al. |
| 2018/0109444 A1 | 4/2018 | Sajassi et al. |
| 2019/0182158 A1* | 6/2019 | Fitzgerald ............. H04L 67/565 |
| 2019/0356599 A1 | 11/2019 | Brissette et al. |
| 2020/0351989 A1* | 11/2020 | Ahmet ............. H04W 12/03 |
| 2022/0255856 A1 | 8/2022 | Barcaru et al. |
| 2023/0388229 A1 | 11/2023 | Lavu et al. |

OTHER PUBLICATIONS

U.S. Appl. No. 17/168,900, filed Feb. 5, 2021.
U.S. Appl. No. 17/360,041, filed Jun. 28, 2021.
U.S. Appl. No. 17/360,048, filed Jun. 28, 2021.
U.S. Appl. No. 17/360,050, filed Jun. 28, 2021.
U.S. Appl. No. 17/168,963, filed Feb. 5, 2021.
U.S. Appl. No. 17/168,909, filed Feb. 5, 2021.

* cited by examiner

MULTI-CAST REDISTRIBUTION AND REMAP FOR MULTI-AREA NETWORKS

CROSS-REFERENCE TO RELATED APPLICATIONS

This application is related to U.S. patent application Ser. No. 17/168,900 titled "Shortest Path Bridging (SPB) Multi Area," filed Feb. 5, 2021, U.S. patent application Ser. No. 17/168,943 titled "MAC-Based Redistribution Policy for Multi-Area Networks," filed Feb. 5, 2021, and U.S. patent application Ser. No. 17/168,909 titled "Shortest Path Bridging (SPB) Multi Area and Virtual SPB Node," filed Feb. 5, 2021, which are herein incorporated by reference in their entireties.

FIELD

This disclosure relates generally to inter-network services for multi-area networks. For example, some aspects of this disclosure relate to providing access to neighboring areas in a multi-area network. In some aspects, this disclosure relates to providing Layer 2 or Layer 3 network services across boundaries to different network areas in a multi-area network. In some aspects, this disclosure relates to providing redistribution of routes across a multi-area network. In some aspects, this disclosure relates to providing redistribution of multicast streams in a multi-area network. In some aspects, this disclosure relates to media access control (MAC) synchronization in a multi-area network.

BACKGROUND

Shortest-Path Bridging (SPB) currently only allows for the formation of a flat network in a single Intermediate System to Intermediate System (ISIS) area, putting a practical deployment limitation on number of nodes that an SPB network can have. This limitation is due to issues related with growing a network size; increasing the number of nodes in the SPB network increases the Link State Database (LSDB) size. Increased LSDB size requires higher computing resources such as disc space, memory, and processing power. This increased LSDB size creates problems in terms of unreliable convergence and scaling. The large LSDB size also requires providing all nodes in the network with higher level of capability since in a link state-based protocol, all nodes in the network maintain the complete link state database (LSDB). This flat network also creates a problem of experiencing network fluctuations throughout the network if there is some change in any part of the network.

SUMMARY

Provided herein are system, method and/or computer program product aspects, and/or combinations and sub-combinations thereof, which provide inter-network services for multi-area networks.

Systems and methods for providing paths to neighboring areas in a multi-area network can include generating, in a control plane for the multi-area network, one or more Type-Length-Values (TLVs) for one or more networks in the multi-area network connected to a first network. The control plane can send the one or more TLVs to one or more nodes in the first network. The one or more nodes can generate one or more Link State Protocol data units (LSPs), each including one or more of the TLVs. The one or more nodes can flood the first network with the one or more LSPs. The first network can update its LSDB based on the one or more LSPs.

In some aspects, the LSDB can advertise that the one or more networks are accessible to the first network.

In some aspects, some of the one or more nodes can be virtual nodes that represent a neighboring network to the first network.

In some aspects, some of the one or more nodes can be boundary nodes in the first network on a boundary between the first network and a neighboring network.

In some aspects, the boundary nodes can generate other LSPs that include at least one of the one or more TLVs. The boundary nodes can flood the neighboring network with the other LSPs. The neighboring network can update its LSDB based on the other LSPs.

In some aspects, the boundary nodes can generate an LSP for a TLV for the first network. The boundary node can flood the neighboring network with the LSP. The second network can update its LSDB based on the LSP.

In some aspects, the each of the one or more TLVs can have a network identifier (ID) for the first network, neighbor area IDs for neighboring networks, and metrics for the neighbor area IDs.

Systems and methods for providing redistributing services at a boundary between a first network and a second network of a multi-area network include receiving a packet for a service at a boundary node on the boundary. The packet can be encapsulated in a first encapsulation and the boundary node can translate the packet from the first encapsulation to a second encapsulation. The boundary node can forward the packet to a node in the second network.

In some aspects, the boundary node can point a first media access control (MAC) address for the service to a second node in the first network. The boundary node can synchronize a second MAC address for the service in the first network with the first MAC address.

In some aspects, the boundary node can receive a policy update from a control plane. The policy update can enable the service to be redistributable between the first network and the second network.

In some aspects, the first encapsulation can include a source address of a second node, a destination address based on the second node and a service instance identifier (I-SID) of the service, a boundary value identifier for the boundary node, and the I-SID. The second node can be a boundary node on a different boundary between the second network and a third network.

In some aspects, the second encapsulation can include a source address of a virtual node that represents the first network to the second network, a destination address based on the virtual node and the I-SID of the service, a boundary value identifier for a node on the boundary, and the I-SID.

In some aspects, the boundary node can forward the packet from with the virtual node as the root.

In some aspects, a boundary node on a boundary between a first network and a second network in a multi-area network can be configured to receive a packet for service, translate a first encapsulation of the packet to a second encapsulation, and forward the packet to a destination node in the second network.

In some aspects, a non-transitory computer readable storage medium having computer readable code thereon can include instructions that can cause a computer system to perform operations. These operations can include causing a boundary node to receive a packet for a service that is encapsulated in a first encapsulation, translate the first encapsulation to a second encapsulation, and forward the packet a node in a second network.

Systems and methods for providing a service redistribution policy for a multi-area network can include receiving at a first node in a first network a packet from a host accessing a service across a boundary between the first and second network in the multi-area network. The first node can verify whether a link-state database (LSDB) includes a path for the service between the first network and a second network. In response to the LSDB not including a path, the first node can discard the packet. In response to the LSDB including a path, the first node can forward the packet. Forwarding the packet can include encapsulating the packet at the first node for transmission through the network and sending the packet through the first network to boundary nodes. Forwarding the packet can also include pointing a MAC address for the service at the first node and synchronizing the MAC address for the service across the boundary nodes in the network. The boundary node can translate the encapsulation for transmission in a neighboring network and forward the packet across the boundary to a destination in the second network.

In some aspects, the packet can be discarded if the LSDB does not include the path.

In some aspects, a control plane can enable a service to redistributable between the first network and the second network.

Systems and methods for providing a service redistribution policy for a multi-area network can include receiving a packet from a host for a service at a node in a first network. The packet can have a destination across one or more boundaries between the network and a second network. The node can identify a route from the first network to a destination in the second network and assign the route from a routing table for the service based on the destination. The multi-area network can then forward the packet for the service using the route.

In some aspects, the service can be configured to be redistributable in a first direction from a first network into a second network and a second direction from the second network into the first network. In some aspects, the service can be configured to be redistributable from the first network towards the second network across each boundary between the first network and the second network.

In some aspects, the route can be installed in the routing table for each boundary in response to the service being configured to be redistributable across those boundaries.

Systems and methods for providing multicast services across a boundary in a multi-area network between a first network and a second network can include identifying a route for a multicast stream at a node in a network. The multicast stream can include a first service instance identifier (I-SID) and a source node identifier that can satisfy a policy for redistribution across the boundary. The source node identifier can correspond to the node. The multicast stream can have a destination requiring the multicast stream to be routed across the boundary. The node can send the multicast stream through the network to a boundary node based on the route. The boundary node can receive the multicast stream, remap the first I-SID to a second I-SID, update the source node identifier to a node in a neighboring network across the boundary, and forward the multicast stream to the neighboring network across the boundary. In some aspects, this process can be repeated at further network boundaries.

In some aspects, a second node in the first network can identify a second route for a second multicast stream that has a third I-SID and a third source node identifier. The second multicast stream can satisfy a policy for redistribution from the first network across the boundary through the boundary node and can be routed across the boundary. The second node can send the second multi-cast stream through the first network to the boundary node based on the second route. The boundary node can receive the second multicast stream, remap the third source-node identifier to the second source node identifier and the third I-SID to a fourth I-SID that is different from the second I-SID. The boundary node can forward the second multicast stream to the second network. In some aspects, the third I-SID and the first I-SID are identical.

In some aspects, the boundary node can receive a route for the multicast stream that is configured to satisfy the policy for redistribution. The route can be a route from the source node to a destination node in a different network. The boundary node can, in response to receiving the route, install the route in an LSDB.

In some aspects, the boundary node can receive a message assigning the second I-SID to the multicast stream and the second multicast stream in the second network.

In some aspects, the second multicast stream can be an identical multicast service as that offered by the multicast stream. In response to this, the boundary node can remap the third source node identifier to the second source node identifier, and the third I-SID to the second I-SID and forward the second multicast stream into the second network. In some aspects, the third I-SID and the first I-SID are identical.

In some aspects, the source node can be a virtual node in the second network configured to represent the first network. The multicast stream can be forwarded into the second network from the first network and be configured to originate from the virtual node.

Systems and methods for synchronizing addresses between multiple forwarding nodes in a multi-area network can include receiving a MAC learn Type-Length-Value (TLV) from a node at a boundary node in a network, in which the node is from a different network as the boundary node. The MAC learn TLV can include a customer MAC address and a first backbone MAC destination address (BMAC-DA). A service corresponding to the customer MAC address can be present on the node. A multi-area network synchronizer can add the service to a MAC table with a customer MAC address pointing to the first BMAC-DA in the boundary node and then update the respective MAC table for each other boundary node on the boundary.

In some aspects, the respective MAC tables can be updated based on the MAC table by creating an updated MAC learn TLV based on the MAC table in a control plane. The control plane can send the updated MAC learn TLV to each of the other boundary nodes, which then can update their respective MAC tables based on the updated MAC learn TLV.

In some aspects, in response to the customer MAC address added to the MAC table being present for longer than a predetermined time period, the first boundary node can remove the customer MAC address from the MAC table. The control plane can update the respective MAC address from the respective MAC for each other boundary node based on the MAC table.

In some aspects, in response to the first boundary node removing the customer MAC address, the first boundary node can determine whether a second MAC learn TLV is stored in a TLV list. TH second MAC learn TLV can include the customer MAC address and a second BMAC-DA. If the second MAC learn TLV is stored in the TLV list, the first boundary node can promote the customer MAC address pointing to the BMAC-DA to the MAC table. The control plane can update the respective MAC table for each other boundary node based on the MAC table.

In some aspects, if two MAC learn TLVs are received at the first boundary node, one from a node in the first network and one from a different network, the first boundary node can select the MAC learn TLV from the node in the first network and add the customer MAC address pointing to the second BMAC-DA to a MAC table for the first boundary node. The respective tables for each other boundary node on the boundary can be updated based on the MAC table for the first boundary node. In some aspects, both the MAC learn TLV from the node in the first network and the MAC learn TLV from the node in the different network can be stored in a TLV list.

Further aspects, features, and advantages of the present disclosure, as well as the structure and operation of the various aspects of the present disclosure, are described in detail below with reference to the accompanying drawings.

BRIEF DESCRIPTION OF THE DRAWINGS/FIGURES

The accompanying drawings, which are incorporated herein and form a part of the specification, illustrate aspects of the present disclosure and, together with the description, further serve to explain the principles of the disclosure and to enable a person skilled in the art(s) to make and use the aspects.

In the drawings, like reference numbers generally indicate identical or similar elements. Additionally, generally, the left-most digit(s) of a reference number identifies the drawing in which the reference number first appears.

DETAILED DESCRIPTION

Figure 1:
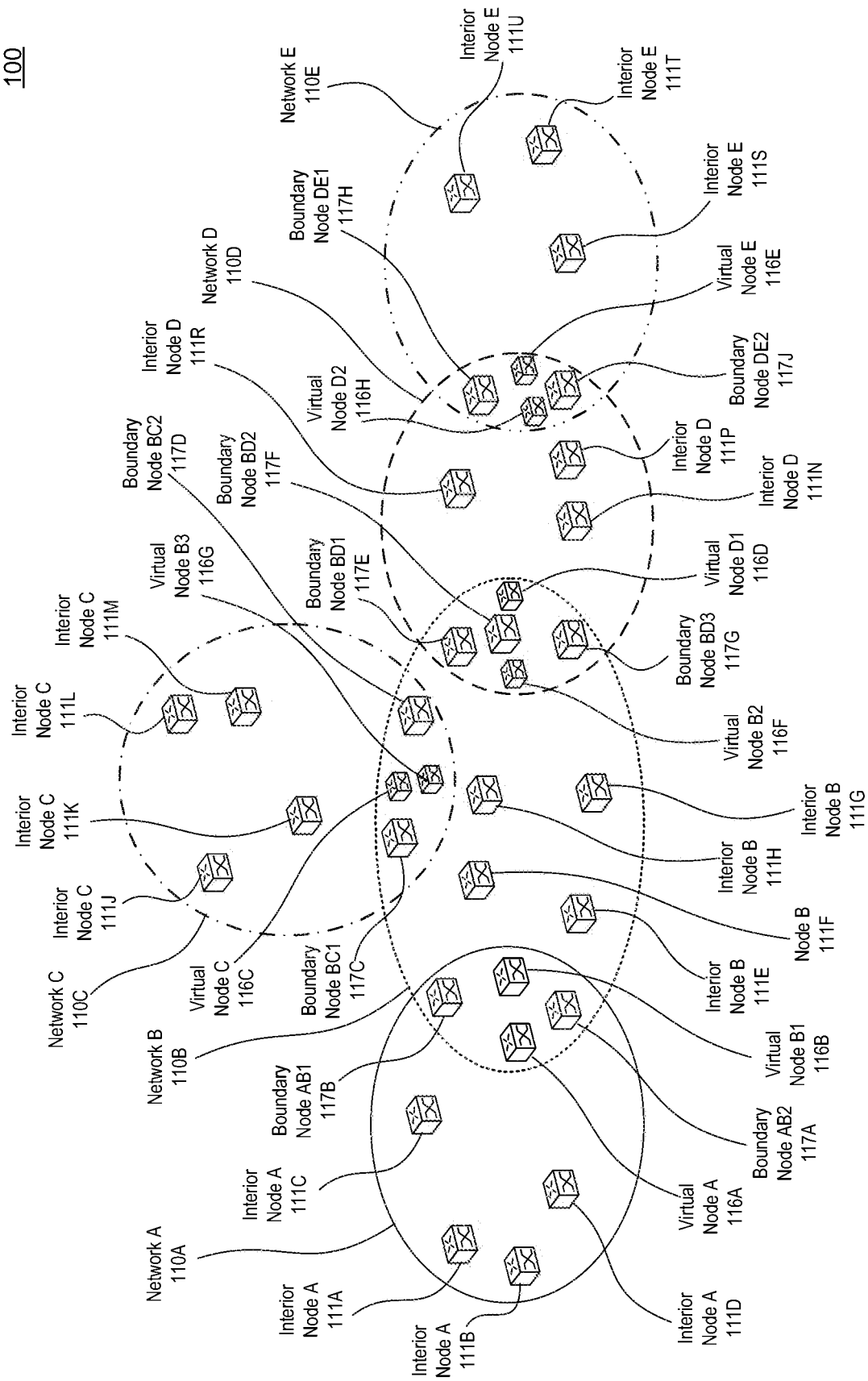
FIG. 1 illustrates a block diagram of a multi-area network, according to some aspects.

Provided herein are system, method and/or computer program product aspects, and/or combinations and subcombinations thereof, which provide inter-network services for multi-area networks.

An ISIS protocol has the provision to define multiple areas in a network topology, which can be joined together in a strictly hierarchical configuration. The area defined by the ISIS protocol is defined as either Level 1 or Level 2. Traffic between any Level 1 areas must traverse the Level 2 area. In other words, any communication between the Level 1 area nodes has to traverse the Level 2 area. Level 2 area is, therefore, the backbone area that connects all Level 1 areas. With two levels, only two layers of hierarchy are possible. Even if some variations of the ISIS protocol can define additional levels to increase the level of hierarchy, they still suffer from the restriction of having to construct the network in a strict hierarchy and having traffic between nodes in different areas at the same level to move up the level and down again.

In contrast to the traditional ISIS protocol, some aspects of this disclosure make use of architectures that combine multiple SPB domains without the restriction of going through a particular SPB domain. For example, some aspects of this disclosure use multiple instances on a node to achieve an ISIS hierarchy or any flexible topology, without the need to have a backbone. In turn, these aspects of the disclosure provide optimal flexibility to construct the network.

Some aspects of this disclosure are implemented in an SPB fabric with multiple smaller SPB fabrics. In some examples, each one of the multiple smaller SPB fabrics can include its own network area (e.g., ISIS area) and can use multiple ISIS instances. According to some aspects, multi-area SPB fabric/network is an SPB network with smaller networks in multiple areas connected hierarchically or in any loop-free flexible topology. As mentioned above, the multi-area SPB can avoid having a single flat SPB fabric, which has limited scalability due to computing, memory, and performance constraints.

In the multi-area SPB architecture, a boundary node can interconnect to multiple ISIS areas. In some examples, each ISIS area has its own local and remote LSPs in the LSDB and Network-to-Network Interface (NNI) (although, a physical port might support logical NNI interface for both ISIS areas). To keep information about each ISIS area separate, a separate ISIS instance can be created that passes information between ISIS areas. In some examples, each ISIS instance includes information associated with its corresponding local LSP and remote LSP. Additionally, or alternatively, the ISIS instances in the boundary node can communicate with (e.g., pass to) each other information associated with their corresponding ISIS area.

Some aspects of this disclosure are directed to systems and methods that incorporate virtual node(s) (e.g., virtual SPB node(s)) in a multi-area fabric (e.g., a multi-area SPB fabric). Many fabric technologies use link-state protocols for their control plane. An SPB fabric is based on ISIS, a link-state based protocol in which all nodes in an area have a complete copy of the entire LSDB (Link State Database) of that area that includes the identification, topology, services, and the like of every node in the area. This allows every node to have the same view of the network and compute shortest-path unicast and multicast trees consistently. The size of the LSDB has a direct impact on the resource requirement for all participating nodes (e.g., RAM, CPU power, fast path ASIC capabilities, etc.). This imposes limits on possible network size and structure—especially regarding the number of nodes and number of services (e.g., Layer 2 services, VRFs (Virtual Route Forwards), route prefixes, IP (Internet Protocol) multicast streams, and others).

According to some aspects, the multi-area SPB fabric (or multi-area for other fabric technologies) can include one or more virtual nodes. In some examples, the virtual nodes can replace and represent in the LSDB any number of nodes in any number of ISIS areas and the nodes' services (or a subset of their services) as a single entity. Using existing methods, the network topologies can increase in complexity as the number of real nodes and real links connecting them increases. In some aspects, disclosed herein are methods and systems for substituting virtual nodes and virtual links from the virtual nodes to boundary nodes (the nodes that have direct ISIS adjacencies to other areas). This can allow for a less CPU-intensive computation of, for example, the shortest path trees. Multiple virtual links can also allow for external areas to be connected to multiple boundary nodes in resilient and large bandwidth designs, but still be represented just once in the LSDB.

FIG. 1 illustrates a block diagram of a multi-area network 100, according to some aspects. Multi-area network 100 can be a multi-area SPB topology that is segmented into multiple areas. These areas can be connected hierarchically or in any loop-free flexible topology. While the various figures in this disclosure illustrate some exemplary methods for connecting multiple areas in a multi-area network 100, aspects of this disclosure are not limited to these examples, and the multi-area networks 100 of this disclosure can include other topologies.

As an example of the segmentation of multi-area network 100, FIG. 1 depicts several networks, such as network A 110A, network B 110B, network C 110C, network D 110D, and network E 110E (collectively, "networks 110"). Each of networks 110 can be connected to other networks, as illustrated by the overlap between them. In some aspects, an area of the multi-area network can include only one or more boundary nodes (e.g., no interior nodes). In some aspects, a network or area in multi-area network 100 can include one or more interior nodes and one or more boundary nodes. In some examples, a boundary node can have the functionalities of an interior node. In some examples, a boundary node can connect two or more areas in the multi-area SPB, and can run two or more separate ISIS instances (and/or SPB instances). Boundary nodes can provide communication across boundaries between each area that the boundary node is part of. Although some aspects of this disclosure are discussed with respect to boundary nodes that connect two areas, aspects of this disclosure are not limited to two areas and the boundary nodes can connect any number of areas and can run ISIS instances (and/or SPB instances) for each area that they are part of.

In some aspects, as shown in FIG. 1, boundary nodes are illustrated that connect two areas. For example, boundary node AB1 117B and boundary node AB2 117A connect network A 110A to network B 110B, boundary node BC1 117C and boundary node BC2 117D connect network B 110B to network C 110C, boundary node BD1 117E, boundary node BD2 117F, and boundary node BD3 117G connect network B 110B to network D 110D, and boundary node DE1 117H and boundary node DE2 117J connect network D 110D to network E 110E. The boundary nodes are collectively referred to as "boundary nodes 117." Although boundary nodes 117 are illustrated connecting two networks 110, as indicated by the overlap of the network areas, any number of boundary nodes 117 can be used to connect two or more areas. In addition, different areas can have different number of boundary nodes 117. Additionally, although boundary nodes 117 are shown to connect two areas, boundary nodes 117 can connect two or more areas.

In some aspects, boundary nodes 117 that connect two networks 110 have connectivity to both. For example, boundary nodes AB1 117B and AB2 117A can have connectivity to network A 110A and network B 110B. In some aspects, this connection is not a physical connection, but is instead a software-implemented or virtual connection.

In some aspects, each of networks 110 can include one or more interior nodes (non-boundary nodes). For example, network A 110A can include interior nodes A 111A, 111B, 111C, and 111D, network B 110B can include interior nodes B 111E, 111F, 111G, and 111H, network C 110C can include interior nodes C 111J, 111K, 111L, and 111M, network D 110D can include interior nodes D 111N, 111P, and 111R, and network E 110E can include interior nodes E 111S, 111T, and 111U. The interior nodes are collectively referred to as interior nodes 111. In some examples, interior nodes 111 (non-boundary nodes) from an area are not connected to other interior nodes 111 of a different area. For example, interior node A 111A of network A 110A is not connected to interior node B 111E of network B 110B. However, in some examples, networks 110 can reach other areas through boundary nodes 117 and/or adjacent networks. Each of networks 110 can include any number of interior nodes 111; the number of interior nodes 111 depicted in FIG. 1 is exemplary.

In some aspects, a node (e.g., interior node 111 or boundary node 117) as discussed in this disclosure can include a fabric node and/or a network node such as, but not limited to, a connection point inside and/or at the boundary of a network that can receive, transmit, create, and/or store data and/or other information. Some non-limiting examples of a node can include computers, routers, gateways, modems, printers, scanners, TVs, smart phones, Internet of Things (IoT) devices, bridges, switches, and the like.

In some aspects, interior nodes 111 or boundary nodes 117 can be associated with one or more services. For example, interior node A 111A can be associated with service Y, interior node C 111K can be associated with service X, and interior node B 111E can be associated with service Z. According to some examples, services X, Y, and Z can include services provided by a network node, such as, but not limited to, services provided by computers, routers, gateways, modems, printers, scanners, TVs, smart phones, IoT devices, bridges, switches, and the like. In some aspects, functions performed by networks 110 or network nodes can be performed by computer systems, such as computer system 2200 described below.

In some aspects, multi-area network 100 can increase overall node counts without adding additional burden on the existing nodes. Multi-area network 100 can connect to many networks 110 and can support "chained" architectures and have high (as a non-limiting example, at least 2x100 Gbps) throughput between network 110 areas.

Additionally, or alternatively, multi-area network 100 can provide security by providing service security boundaries. Multi-area network 100 can also provide redundancy by, for example, supporting at least two boundary nodes 117 for area interconnect, providing sub-second convergence when a boundary node 117 fails, and keeping LSDBs for each network 110. In some examples, one or more of boundary nodes 117 support Backbone Edge Bridge (BEB) functionality.

In some examples, multi-area network 100 can provide simplicity and re-use by using few commands to configure, for example, two instances of ISIS. Multi-area network 100 can provide transparency by providing, for example, Service Instance Identifiers (I-SIDs)/services numbering that is coordinated across multi-area network 100, the ability to introduce multi-area networking without the need to upgrade the network, and support for some existing features across boundaries. For example, in some aspects, routes can be installed in nodes or packets can be encapsulated using existing commands or protocols.

In some aspects, adjacent networks 110 can be connected by boundary nodes 117 that have different ISIS topologies. For example, boundary node AB1 117B can have an ISIS topology area for network A 110A and boundary node AB2 117A can have an ISIS topology for network B 110B. For all nodes (e.g., interior nodes 111 and boundary nodes 117) in a given network 110, there is an area topology that is visible to the nodes, and there is an out-of-area topology that is not visible to any nodes except for boundary nodes 117. For example, the interior nodes A 111A-D and boundary nodes AB1 117B and AB2 117B can identify the ISIS topology of boundary node AB1 117B as the ISIS topology for network A 110A, while the ISIS topology of boundary node AB2 117A is only visible to boundary nodes 117. In aspects where boundary nodes 117 are present in more than two networks 110, each boundary node 117 can have the ISIS topology for each network 110 that boundary node 117 is a part of.

From the point of view of the interior nodes 111, boundary nodes 117 act as an area or network gateway to transport services to and from one area or network across area or network boundaries from other networks. Boundary nodes 117 (e.g., boundary nodes AB1 117B and AB2 117A) can summarize the services from network areas that they are part of (e.g., network A 110A) and send the summarized services to other networks areas (e.g., network B 110B, network C 110 C, network D 110D, and network E 110E). Boundary nodes 117 (e.g., boundary nodes AB1 117B and AB2 117A) can also summarize services from other network areas (e.g., network B 110B, network C 110 C, network D 110D, and network E 110E) and send, for example, the summarized services to the network area (e.g., network A 110A). When the traffic for the services cross from one network area (e.g., network A 110A) to another network area (e.g., network B 110B), appropriate packet translation occurs at boundary nodes 117 (e.g., boundary nodes AB1 117B and AB2 117A). The summarization and packet translation are done so that network areas do not need to know about each network area (e.g., network A 110A does not need to know about the topology of network B 110B, network C 110 C, network D 110D, and network E 110E) internal topological information and/or vice versa. For example, an interior node 111 (e.g., node A 111A) does not need to know about the nodes beyond its own network area (e.g., nodes in network B 110B, network C 110 C, network D 110D, and network E 110E). Therefore, multi-area network 100 can increase node counts and does not add additional burden on existing fabric nodes.

In some aspects, each of boundary nodes 117 has two or more different topological databases. Each topological database is for one of the areas that boundary nodes 117 are located in. In some examples, these databases are ISIS link state databases (LSDB). Each area ISIS database can be the LSDB of nodes from a network area. For example, for boundary nodes AB1 117B and AB2 117A of network A 110A, one area ISIS LSDB is made of interior nodes A 111A-D as well as boundary nodes AB1 117B and AB2 117A. The other area ISIS LSDB is made up of nodes in network B 110B; that is interior nodes B 111E-H and boundary nodes AB1 117B, AB2 117A, BC1 117C, BC2 117D, BD1 117E, BD2 117F, and BD3 117G. These two different and separate ISIS databases are from two different instances of ISIS. Boundary nodes 1117 can perform shortest path (e.g., shortest path first (SPF)) computation using the area ISIS database and SPF computation for each area to which they are connected.

Although in FIG. 1 a boundary node 117 is illustrated to connect two networks 110 and have two different and separate ISIS instances (e.g., ISIS databases) for the areas (e.g., one separate ISIS instance, such as an ISIS database, for each area), aspects of this disclosure are not limited to these examples. For example, a boundary node 117 can connect more than two networks 110 and can have more than two different and separate ISIS instances (e.g., ISIS databases) for networks 110 (e.g., one separate ISIS instance, such as an ISIS database, for each network area).

Multi-area network 100 also includes virtual node A 116A, virtual node B1 116B, virtual node C 116, virtual node D1 116D, virtual node E 116E, virtual node B2 116F, virtual node B3 116G, and virtual node D2 116H. The virtual nodes can be collectively referred to as "virtual nodes 116." Virtual nodes 116 can represent networks 110 to an adjacent network 110. Representing a network 110 to another network 110 with a virtual node can include representing or advertising some or all services available on interior nodes 116 in the neighboring networks 110.

Virtual node 116 (e.g., virtual node A 116A) representing the first network (e.g., network A 110A) act as a node in the second network (e.g., network B 110B), as a synthesized representation of all (or some of) the services on all (or some of) the interior nodes of the neighboring network that are not visible across network boundaries. Symmetrically, virtual node 116 (e.g., virtual node B1 116B) representing the second network 110 (e.g., network B 110B) acts as a node in the first network (e.g., network A 110A).

Virtual node 116 can represent multiple neighboring networks 110 to the network 110. For example, virtual node B 116B can represent each other network 110 (e.g., network B 110B, network C 110C, network D 110D, and network E 110E) to network A 110A. The information about the services and topologies necessary for virtual node B 116B to perform this function can be passed through networks 110 of multi-area network 100 via boundary nodes 117, virtual nodes 116, or both.

In some examples, the number of virtual nodes 116 created in network 110 can depend on the services provided by network 110 and/or other network(s) 110 in multi-area network 100. As a non-limiting example, Layer 2 services, Multicast over SPB, IP Shortcut, and Layer 3 services can be represented by virtual nodes. Layer 2 services can be services that are distributed based on MAC addresses. Layer 3 services can be services that are distributed based on IP addresses.

Each virtual network providing services from a network can be exposed, meaning that it is viewable to the adjacent network. While FIG. 1 depicts single virtual nodes 116 for each adjacent network 110, other aspects can include multiple virtual nodes 116 for representing services to network 110 from adjacent networks 110. For example, for services except for Layer 2 services, network A 110A can include two additional virtual nodes 116 (not shown) beyond virtual node A 116A in area view as connected through boundary nodes AB1 117B and AB2 117A. These two additional virtual nodes can include LSPs for multicast streams, routes for IP Shortcut (IPSC) and so on, but will not advertise any of the Layer 2 service I-SIDs (Service Instance Identifiers). In some examples, as Layer 2 service I-SIDs can be advertised in network A 110A by virtual node B 116B. In other words, in some aspects of this disclosure, the number of virtual nodes can depend on the services of the area(s) that each virtual node is representing.

According to some aspects, using a policy applied on the boundary nodes, multi-area network 100 can control which services from one network 110 are exported to another network 110 view by being included in the LSPs of the corresponding virtual node 116. In a non-liming example, a Layer 2 service I-SID can be stopped from crossing network 110 boundaries. In this non-liming example, other services (e.g., multicast streams, routes for IPSC, and the like) can be allowed to cross network 110 boundaries. In another non-limiting example, Layer 2 service I-SIDs can be stopped from crossing network 110 boundaries or can be allowed to cross network 110 boundaries in one or both directions.

Virtual nodes 116 can be emulated by boundary nodes 117 in a network 110. According to some aspects, virtual node 116 that is emulated using two or more boundary nodes 117 can provide additional redundancy, usability, and/or security to multi-area network 100. For example, an interior node 111 of network 110 can communicate with and/or use services of virtual node 116 of network 110 (which can represent out-of-area services) instead of using two or more boundary nodes 117 of that area. In a non-liming example, if interior node 111 communicates with boundary node 117 (e.g., instead of a virtual node 116) and boundary node 117 is unavailable, interior node 116 changes and/or updates, for example, its database(s) to communicate with another boundary node 117. However, by communicating with virtual node 116, interior node 111 does not change and/or update, for example, its database(s) if boundary node 117 is unavailable. In some examples, interior node 111 does not change and/or update, for example, its database(s) because interior node 111 is communicating with virtual node 116 (e.g., uses the address of virtual node 116) instead of communicating with boundary nodes 117 (e.g., using the address(es) of boundary nodes 117 that emulate virtual node 116).

As discussed further above, multi-area network 100 can be configured to eliminate the level distinctions of traditional ISIS protocols. Because there is no Level 2 area to handle communication between networks 110, boundary nodes 117 and virtual nodes 116 can be configured to handle various aspects of inter-network communication and services for multi-area network 100.

Figure 2:
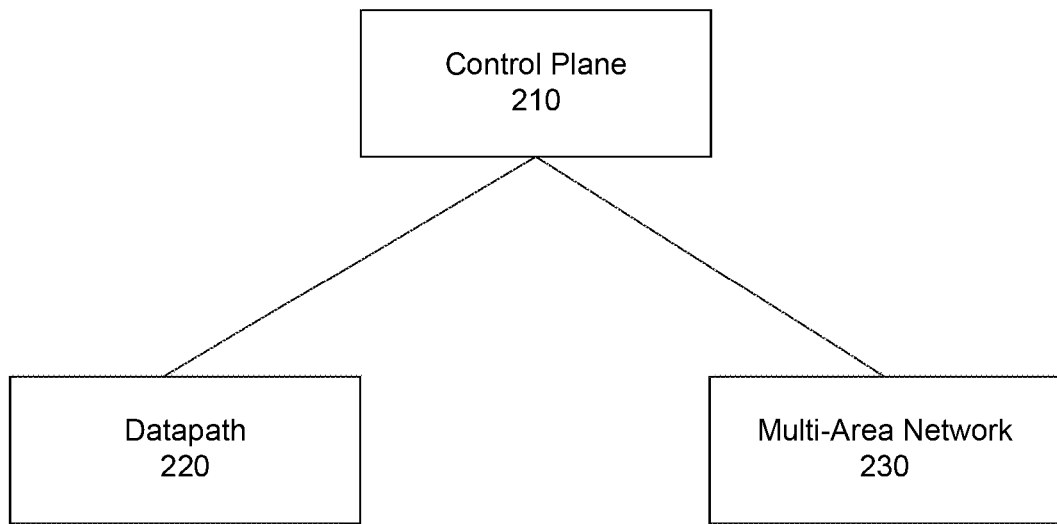
FIG. 2 illustrates a block diagram for a control plane for a multi-area network, according to some aspects.

FIG. 2 illustrates a block diagram for a control plane system 200 for a multi-area network, according to some aspects. The control plane system 200 has a control plane 210 that connects to a datapath 220 and a multi-area network 230. Multi-area network 230 can be an aspect of the multi-area networks described herein, such as multi-area network 100. The connection between multi-area network 230 and a control plane 210 can be over a fabric technology. In some aspects, the fabric technology allows communication or connection between entities without an IP connection.

Datapath 220 can be data processing elements, such as some or all of a computer system (e.g., computer system 2200). In some aspects, datapath 220 can store state information about the multi-area network, its topology, services available, and MAC information. Datapath 220 can by modified to update or change the information stored therein. In some aspects, datapath 220 can provide information to control plane 210 regarding events or commands for managing MAC information in the multi-area network.

In some aspects, the control plane 210 can receive information from the datapath 220 and send out update information to the multi-area network 230. In some aspects, packets analyzed or processed in the datapath 220 can be used to program tables of information for later use and send the information to the control plane 210.

Control plane 210 can be configured to send messages to datapath 220 or multi-area network 230. In some aspects, the messages can be sent by certain protocols, such as inter-process communication (IPC) protocols or remote procedure call (RPC) protocols.

Figure 3:
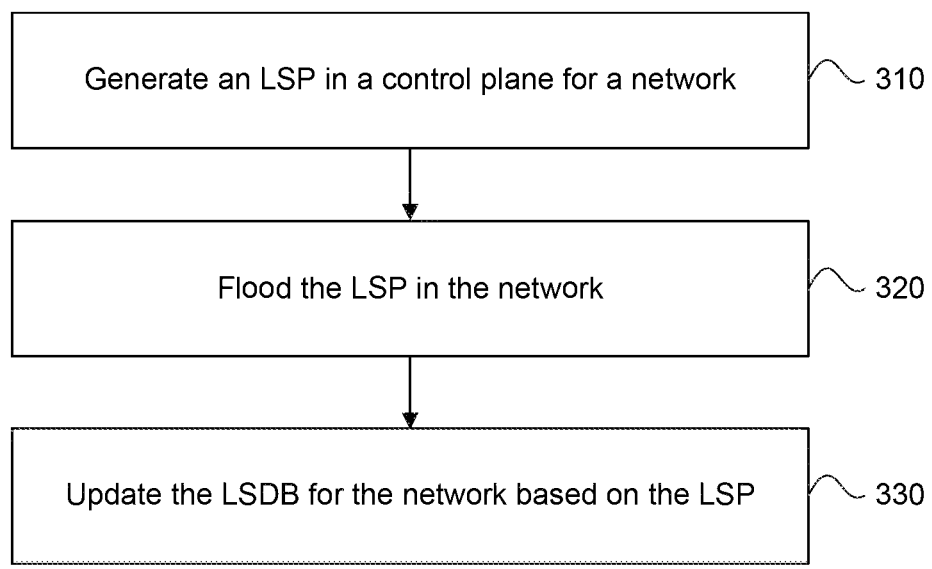
FIG. 3 is a flow chart illustrating a method for establishing paths to other areas in a multi-area network, according to some aspects.

FIG. 3 is a flow chart illustrating a method 300 for establishing paths to other areas in a multi-area network, according to some aspects. Method 300 can be implemented by multi-area network 100 to establish paths between all networks 110 in multi-area network 100. Individual networks 110 can use method 300 to inform other networks 110 in multi-area network 100 of the services that are offered. Method 300 can be used when one of networks 110 changes service offerings or when a new network 110 joins the multi-area network.

In 310, method 300 includes generating an LSP in a control plane 210 for a network 110. The LSP can be generated based on information received from datapath 220. The LSP can include information about networks 110, such as a Type-Length-Value (TLV) for one of networks 110. The TLV can include general network topology of interconnection of networks 110.

In some aspects, the TLV can be a topology TLV. The topology TLV can list the network areas that can be accessed through it. For example, a topology TLV can include a format including one or more of an area ID of the area (e.g., a network 110), one or more neighbor area IDs of the area that are neighbors (e.g., immediate neighbors) of the area, and one or more metrics for each one of one or more neighbor area IDs. In some examples, one or more metrics for a neighbor area can be optional and can include parameters for reaching that neighbor area.

In a non-limiting example, a topology TLV of a virtual node can have the following format: Area <ID>, Neighbor <Area ID> (for Area <ID>), Metric (for Neighbor <Area ID>). However, this disclosure is not limited to this example and aspects of this disclosure can have other topology TLV formats. For example, referring now to FIG. 1, network A 110A can be a first network and network B 110B, network C 110C, network D 110D, and network E 110E can be other or exterior networks from the perspective of the boundary nodes connecting networks A 110A and B 110B.

In some aspects, the TLVs can be generated by control plane 210 and passed to multi-area network 230. In some aspects, the TLVs can be passed to nodes in one of networks 110 of multi-area network 230. Virtual nodes 116 or boundary nodes 117 can create the LSP from the TLV for updating LSDBs in network 110.

In some aspects, a generated LSP can also include an information about more than one network. For example, an LSP can include more than one TLVs, each for different networks, or a single TLV can include information about more than one network 110 in the multi-area network.

Returning now to FIG. 3, in 320, method 300 includes flooding the LSP in a network 110. The LSP can be flooded from a virtual or boundary node throughout a network area to each node in a network 110. In some aspects, flooding is sending the LSP through network 110 until it is sent to each node in network 110.

In 330, method 300 includes updating the LSDB for network 110 based on the LSP. Network 110 can update the LSDB based on the TLVs or other information contained in the LSP. The LSDB can be updated by adding or including information about other networks 110 that can be accessed from network 110 through virtual node 116 or border node 117. For example, an LSP can be received at virtual node A 116A with TLVs for other networks 110 that can be accessed through a boundary in the network B 110B. Network B 110B can then update the LSDB based on the LSP to identify other networks 110 that are accessible from virtual node A 116A. In some aspects, a node in network B 110B can access other networks 110 that are connected to network B 110B based on the LSDB.

In some aspects, virtual node 116 can install the TLVs in the LSDB and virtual node 116 can summarize the network areas available through virtual node 116. In some aspects, a single virtual node can represent each network area available through it. In some aspects, a virtual node for each network area available through a network boundary can represent the individual networks.

According to some aspects, method 300 can reduce the overall storage load of the various nodes in the network because fewer nodes in the network 110 stores the topology for adjacent networks 110 (e.g., boundary nodes 117 on the boundary between network 110 and adjacent networks 110) and the remaining nodes store the topology for a single network 110. In some aspects, this can allow the multi-area network to provide more nodes and networks with the same resources as a traditional network with multiple levels.

In some aspects, advertising networks 110 available through boundaries allows a network 110 to identify networks 110 in multi-area network 100 which can be accessed through a particular boundary. In some aspects, network 110 can be advertised as accessible through another network 110. In some aspects, LSDBs can be used to advertise this information in network 110.

In some aspects, multi-area network 100 can use method 300 in each network 110 to identify the remaining topologies of multi-area network 100 automatically. If changes are made to the topology of any network 110 in the multi-area network, new LSPs can be generated that reflect the changes and method 300 can be used to provide automatic or on-demand updates. In some aspects, control plane 210 can distribute LSPs or TLVs to each network in the multi-area network. In some aspects, virtual nodes 116 or boundary nodes 117 can forward LSPs received as a result of method 300 across a boundary to an adjacent network 110, which then can flood the LSPs in the adjacent network.

As non-limiting examples, topology information can be used in additional ways to improve the performance of the network. For example, connectivity fault management (CFM) can use the paths to other networks 110 to check connectivity with nodes that are not visible to a given network 110, such as interior nodes 111 in another network 110. In some aspects, CFM can include source and destination areas in protocol fields to accomplish this.

In another example, policies applied in the multi-area networks, such as IP and IP version 6 (IPv6) unicast and multicast polices, can make use of the paths to other areas in order to identify matching or non-matching criteria for the policy filters. For example, a service may want to access a neighboring network 110 from network 110, but a certain policy can restrict or prevent this. Networks 110 available through a network boundary can be advertised, each by a different virtual node 116. When the service attempts to access the advertised neighboring network 110, the exposed virtual nodes indicate which other networks 110 are accessible. Since the policy restricts the service from accessing neighboring network 110, the filter engine for the policy can match the criteria, identify that it is prohibited, and block the access attempt by the service.

In yet another example, distributed virtual routing (DVR) can use the paths to other networks to allow controllers and non-DVR BEBs to program route and host services advertised by controllers in different areas of a multi-area network. In existing DVR applications, TLVs for programming host routes require knowledge of the nodes that are hosting services. Nodes in network areas of multi-area networks, such as multi-area network 100, do not have the entire network topology for the multi-area network. When a TLV is received from a neighboring network, the nodes that are not aware of the neighboring network (such as interior nodes 111) will discard the TLV, as they do not recognize the source of the TLV. In aspects of the paths to external networks described herein, the TLVs that cross network boundaries can be labeled as coming from the area ID of the original network. The nodes receiving the TLV can recognize that the TLV comes from that neighboring network area based to the network's area ID. This allows the node to accept the TLV and install the host route.

Figure 4:
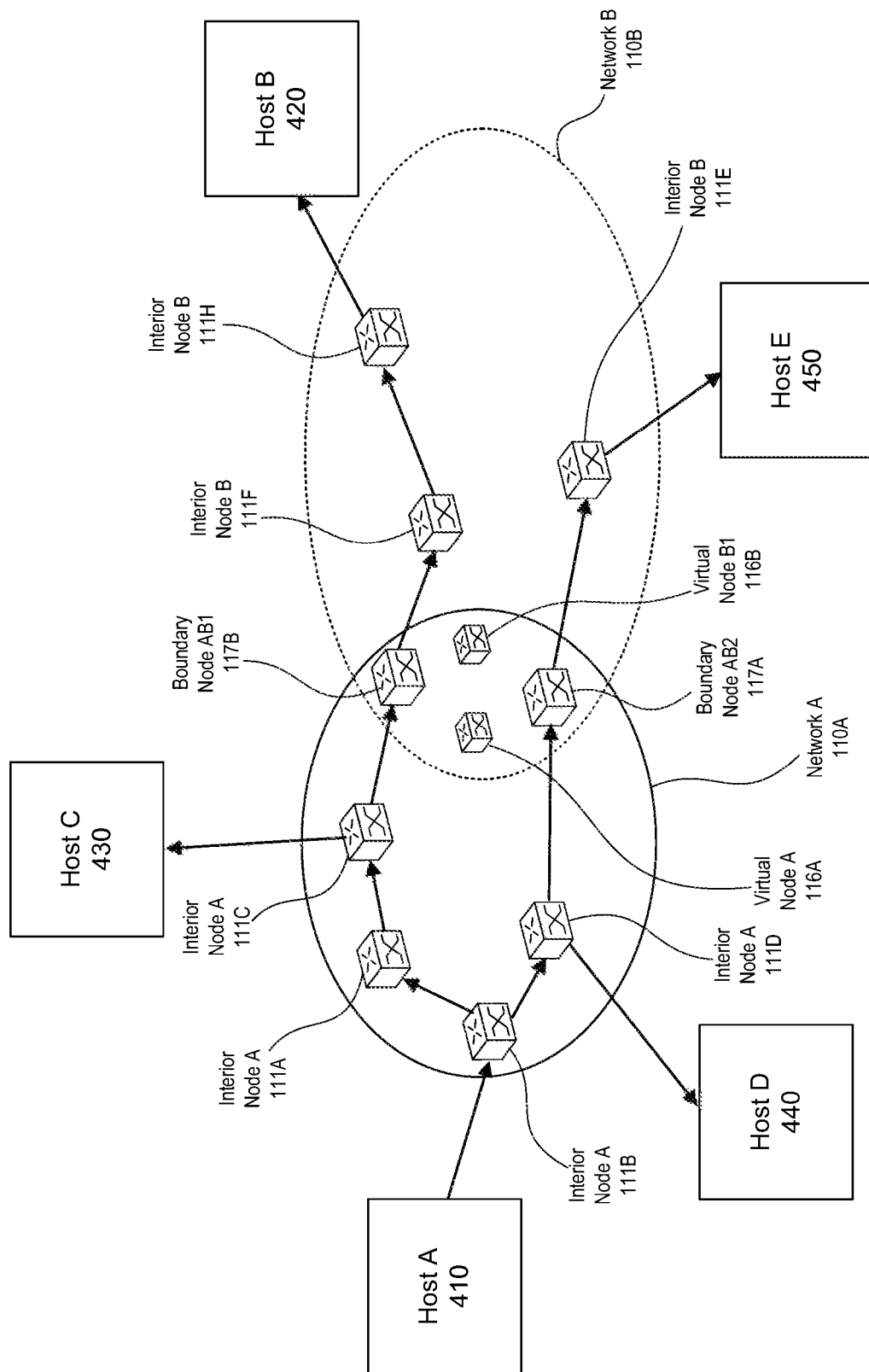
FIG. 4 illustrates a block diagram for a multi-area network for providing network services across a network boundary, according to some aspects.

FIG. 4 illustrates a block diagram for a multi-area network 400 for providing network services across a network boundary, according to some aspects. Multi-area network 400 in FIG. 4 is similar to multi-area network 100 in FIG. 1.

Multi-area network 400 can have network A 110A connected to network B 110B. Network A 110A has interior nodes A 111A-D, boundary node AB1 117B, boundary node AB2 117A, and virtual node B1 116B. Network B 110B has interior nodes B 111E, 111F, and 111H and virtual node A 116A. Network B 110B can share the boundary node AB1

117B and boundary node AB2 117A with network A 110A. The nodes (e.g., interior nodes 111, virtual nodes 116, and boundary nodes 117) can have the same aspects and features of the nodes with the same labels for multi-area network 100 in FIG. 1.

Multi-area network 400 can be accessed by host A 410, host B 420, host C 430, host D 440, and host E 450. This can include multi-area network 400 providing network services to a host, a host requesting access to a service in multi-area network 400, and sending or receiving data from a host to multi-area network 400.

Interior nodes 111 in multi-area network 400 can offer services, as described in this disclosure. These services can be available in network 110 at a node that is located in or can be available across network boundaries. In some aspects, services that are offered across boundaries can be advertised or available in the LSDB or virtual nodes 116 of a network 110. Services that are not available across a boundary will not be advertised in the LSDB or in virtual nodes 116 as available across the boundary. A node can be unaware of services that are offered in other networks 110 but which are blocked from crossing network boundaries.

For example, node A 111B in network A 110A can offer a service X. As a non-limiting example, service X can involve transmitting data through multi-area network 400 to another host.

In some aspects, service X is blocked from crossing network boundaries and will only be available in network A 110A. Host A 410 can access service X to send data to host B 420. In response, node A 111B that is hosting service X can deny the access. In some aspects, node A 111B can determine whether to deny access to a host based on the LSDB.

Host A 410 can access service X to send data to host C 430. In response, node A 111B can allow this access.

In some aspects, service X can be redistributable across network boundaries and is available in more than one network 110 of multi-area network 400. In some aspects, service X can be redistributable based on a MAC address or I-SID. For example, service X can be a Layer 2 service. In some aspects, service X can be configured to be redistributable and then can be accessed in either direction across the network boundary. For example, service X can be a redistributable Layer 2 service, host A 410 can access service X from node A 111B and have a target destination of node B 111H. If service X is also offered for node B 111H, host B 420 can access service X from that node and have a target destination of node A 111D.

In some aspects, service X can be redistributable based upon an IP address. For example, service X can be a Layer 3 service. In some aspects, service X can be configured to be redistributable, but unlike services that distribute based on MAC addresses or I-SIDs, services that are redistributable based on an IP address can be directionally redistributable. That is, the service can be configured to be redistributable from, for example, network A 110A to network B 110B, but not the reverse. Likewise, the service can be configured to be redistributable from network B 110B to network A 110A, but not the reverse. And the services can be configured to be redistributable from network A 110A to network B 110B and the reverse.

As a non-limiting example, for service X offered from node A 111B that is redistributable at least from network A 110A to network B 110B, host A 410 can access service X. Service X can send data from host A 410 to host B 420, host C 430, host D 440, and host E 450. Service X can send the data along the path indicated by the arrows in FIG. 4. The paths shown are examples and should not be considered limiting. However, it should be understood that, for service X to send data across the boundary between network A 110A and network B 110B, the data is sent through a virtual node 116 (e.g., virtual node A 116A) or a boundary node 117 (e.g., boundary node AB1 117B or boundary node AB2 117A).

Figure 5:
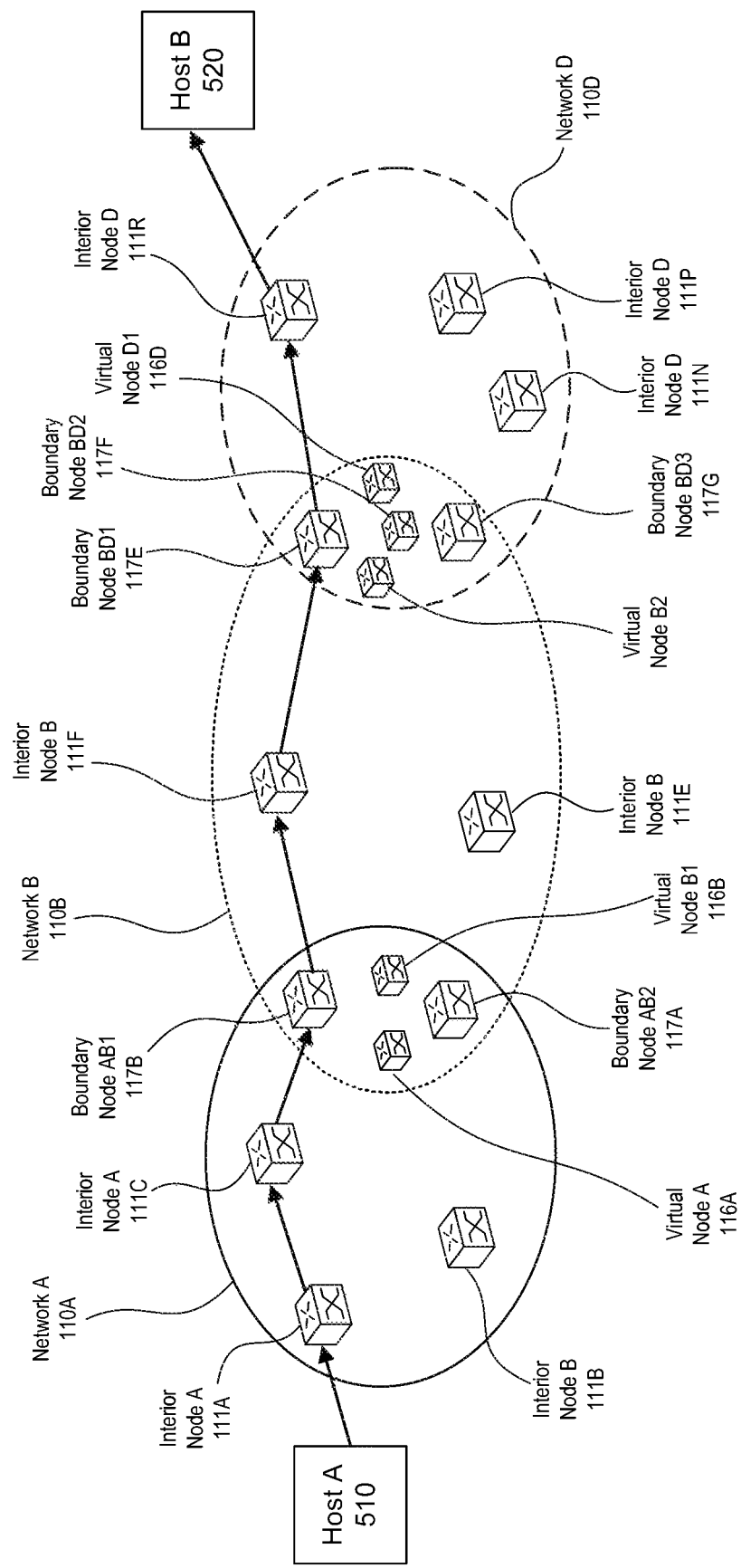
FIG. 5 illustrates a block diagram for a multi-area network for providing network services across multiple network boundaries, according to some aspects.

FIG. 5 illustrates a block diagram for a multi-area network 500 for providing network services across multiple network boundaries, according to some aspects. Multi-area network 500 in FIG. 5 is similar to multi-area network 100 in FIG. 1 and multi-area network 400 in FIG. 4.

Multi-area network 500 can have network A 110A connected to network B 110B, which is further connected to network D 110D. Network A 110A has interior nodes A 111A-C, boundary node AB1 117B, boundary node AB2 117A, and virtual node 116A. Network B 110B has interior nodes B 111E and 111F, virtual node A 116A, virtual node D 116D, boundary node BD1 117E, boundary node BD2 117F, and boundary node BD3 117G. Network B 110B can share boundary node AB1 117B and boundary node AB2 117A with network A 110A. Network D 110D has interior nodes D 111N, 111P, and 111R, and virtual node B2 116F. Network D 110D can share boundary node BD1 117E, boundary node BD2 117F, and boundary node BD3 117G with network B 110B. The nodes (e.g., interior nodes 111, virtual nodes 116, and boundary nodes 117) can have the same aspects and features of the nodes with the same labels for multi-area network 100 in FIG. 1 and multi-area network 400 in FIG. 4.

Multi-area network 500 can be accessed by host A 510 and host B 520. This can include multi-area network 500 providing network services to a host, a host requesting access to a service in multi-area network 500, and sending or receiving data from a host to multi-area network 500.

Interior nodes 111 in multi-area network 500 can offer services, as described in this disclosure. These services can be available in network 110 where interior node 111 is located or can be available across network boundaries. For example, node A 111A in network A 110A can offer service X. As a non-limiting example, service X can involve transmitting data through multi-area network 500 to another host.

In some aspects, service X is blocked from crossing some network boundaries, but not others. In some aspects, services that are offered across boundaries can be advertised or available in the LSDB or virtual nodes 116 of network 110. Services that are not available across a boundary will not be advertised in the LSDB or in virtual nodes 116 as available across the boundary. A node can be unaware of services that are offered in other networks 110 but which are blocked from crossing network boundaries.

For example, service X can be redistributable from network A 110 A to network B 110B, but not to network D 110D. Host A 510 can access service X to send data to host B 520. In response, node A 111A can deny host A 510 access to service X. In some aspects, node A 111A can determine whether to grant access based on the LSDB. For example, node A 111A can determine whether the LSDB includes a path between node A 111A and a node where host B 520 is connected to multi-area network 500. If a path is present in the LSDB, then node A 111A can grant host 510 access to service X. If a path is absent, node A 111A can deny host 510 access to service X.

In some aspects, service X is redistributable across network boundaries and is available in more than one network 110 of multi-area network 500. In some aspects, service X can be redistributable across network boundaries based upon a MAC address or an I-SID. For example, service X can be a Layer 2 service. As a non-limiting example, service X can be a redistributable Layer 2 service, host A 510 can access service X from node A 111A and have a target destination of node D 111R. If service X is also offered for node D 111R, host B 520 can access service X from that node and have a target destination of node A 111A.

In some aspects, service X can be redistributable across network boundaries based upon an IP address. For example, service X can be a Layer 3 service. As a non-limiting example, for service X offered from node A 111B that is redistributable at least from network A 110A to network B 110B and network D 110D, host A 510 can access service X. Service X can send data from host A 510 to host B 520. The service X can send the data along the path indicated by the arrows in FIG. 5. The path shown is an example and should not be considered limiting. However, it should be understood that, for service X to send data across the boundary between network A 110A and network B 110B or the boundary between network B 110B and network D 110D, the data is sent through a virtual node 116 (e.g., virtual node A 116A) or a boundary node 117 (e.g., boundary node AB1 117B).

In some aspects, a service can be redistributable based up on an IP address in different directions across different boundaries. For example, a service X offered in network A 110A can be redistributable to network B 110B, but can be blocked from redistribution to network D. Service X offered in network D 110D can be redistributable to network B 110B and network A 110A. In this case, service X can cross the boundary between network A 110A and network B 110B in both directions, but can only cross the boundary between network B 110B and network D 110D when traveling from network D 110D into network B 110B.

Figure 6:
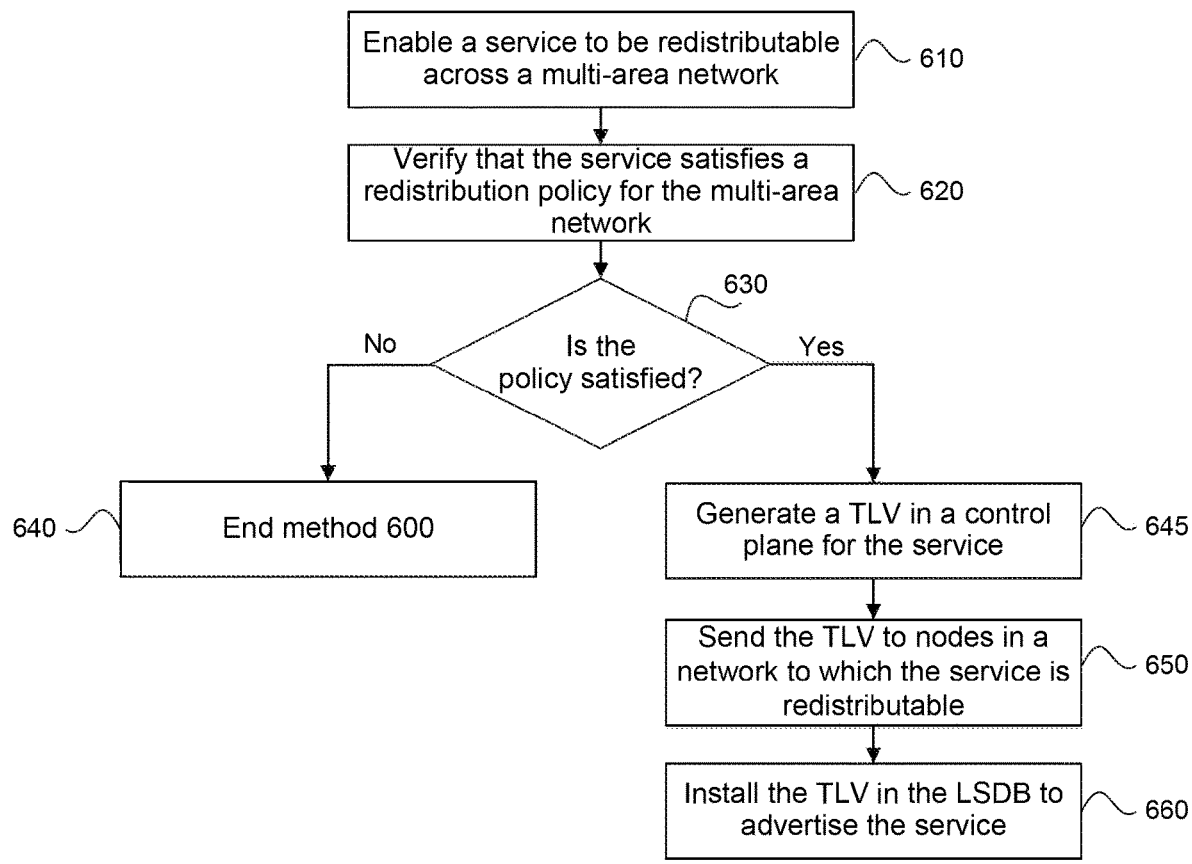
FIG. 6 is a flow chart illustrating a method for configuring and redistributing Layer 2 services in a multi-area network, according to some aspects.

FIG. 6 is a flow chart illustrating a method 600 for configuring and redistributing Layer 2 services in a multi-area network, according to some aspects. Method 600 can be employed in some aspects of the multi-area networks described herein, such as multi-area networks 100, 400, and 500. In some aspects, method 600 can be applied to services that can be redistributed based upon a MAC address or an I-SID.

In 610, a service is enabled to be redistributable across a multi-area network. The service can be a Layer 2 service. In some aspects, operation 610 is performed by control plane 210. Enabling the service as redistributable can change a policy setting for the service, one or more networks 110, or multi-area network 400. For example, the policy setting can be change a policy filter to accept hosts attempting to access the service across a boundary.

In some aspects, operation 610 enables the service to be redistributable between some networks 110 in the multi-area network, but not all. For example, if the multi-area network is multi-area network 500, operation 610 can enable a service offered in network A 110A to be redistributable to network B 110B but not network D 110D. In other aspects, operation 610 can enable a service to be offered in more than one of networks 110 in the multi-area network. For example, operation 610 can enable a service offered in network A 110A to be redistributable to both network B 110B and network D 110D.

In some aspects, operation 610 is optional for some services. For example, services in the multi-area network can be enabled as redistributable as a default. As another example, services in the multi-area network can be enabled as not redistributable as a default and operation 610 is only performed on those services that are intended to be redistributable.

In 620, method 600 includes verifying that the service satisfies a redistribution policy for the multi-area network. This verification can be performed by control plane 210.

Control plane 210 can use a network policy to determine which neighboring networks 110 can be accessed by the service. In some aspects, the network policy is a Layer 2 services redistribution policy. According to some aspects, this verification is necessary because the service can be one for which operation 610 was not applied or because the service is only redistributable across some boundaries In 630, if the service does not satisfy the policy, method 600 proceeds to operation 640. If the service is redistributable, method 600 proceeds to operation 645.

In 640, method 600 terminates.

In 645, method 600 includes generating a TLV in a control plane 210 for the service. In some aspects, the TLV can include information about the redistribution settings for a service. For example, the TLV can include a format including one or more of an area ID of the area (e.g., network 110) where the service is offered, one or more neighbor area IDs of the area that are neighbors of the area where the service is offered and to which the service is redistributable, and one or more metrics for each one of one or more neighbor area IDs. In some examples, one or more metrics for a neighbor area can be optional and can include parameters for reaching that neighbor area.

In 650, method 600 includes sending the TLV to nodes in a network 110 to which the service is redistributable. The TLV can be sent by control plane 210 to the nodes. The nodes can be virtual nodes 116 or boundary nodes 117 in network 110. In some aspects, the TLV can be sent to each network to which the service is redistributable.

In some aspects, operation 650 can include sending the TLV to boundary node 117 as a policy update. The policy update can be configured to enable the service to be redistributable across network boundaries. Boundary node 117 can receive the policy update.

In 660, method 600 includes installing the TLV in the LSDB to advertise the service. The service can be advertised from the nodes in network 110 throughout network 110. In some aspects, installing the TLV in the LSDB can include generating an LSP that includes the TLV and flooding it in network 110 to update the LSDB for each node in network 110.

Figure 7:
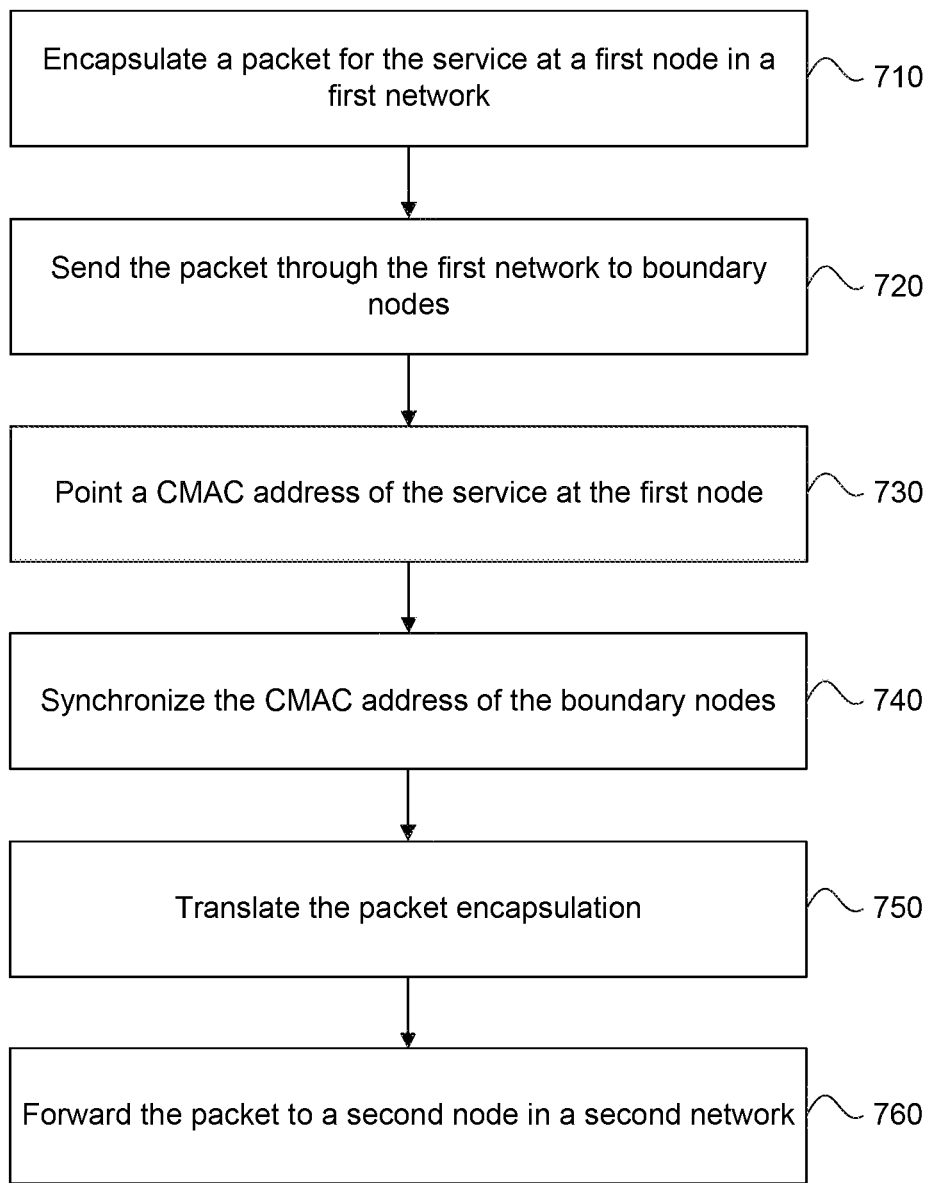
FIG. 7 is a flow chart illustrating a method for providing Layer 2 services in a multi-area network, according to some aspects.

FIG. 7 is a flow chart illustrating a method 700 for provided Layer 2 services in a multi-area network, according to some aspects. The services can be sent across a boundary between two networks 110 in the multi-area network by virtual nodes 116 or boundary nodes 117. In some aspects, method 700 relies on the configuration and redistribution of Layer 2 services provided in method 600. In some aspects, method 700 can be applied to services that can be redistributed based upon a MAC address or an I-SID. In 710, a packet for the service is encapsulated at a first node (e.g., interior node A 111A) in a first network (e.g., network A 110A). In some aspects, the packet can be received from a host attempting to access the service at the node. The packet can be data associated with the service, such as a multicast transmission, a video stream, a print job, and any data required by the service. In some aspects, the first node can be the node offering the service and can be interior node 111 (e.g., interior node A 111A) or a boundary node 117. The packet encapsulation can be performed by MAC in MAC (MiM) encapsulation of the first node. In some aspects, the encapsulation can be configured according to a communications standard for communicating within a network 110.

Encapsulation of the packet can include wrapping or applying information for the transmission of the packet, based on the point of origin, the destination, and the service involved. In some aspects, the encapsulation includes a source address of the first node, a destination address, a boundary value ID, and an I-SID for the service. The destination address can be based on the first node and the I-SID. The boundary value ID can identify boundary nodes 117 or virtual nodes 116 to which a packet is to be sent for forwarding across a boundary. In 720, method 700 sends the packet through the first network to boundary nodes. This can be accomplished using network transmission and reception methods. The sending can be based on the encapsulation. Operation 720 can send the packet through one or more interior nodes in order to reach the boundary nodes. In some aspects, the packet is sent to virtual nodes 116 or boundary nodes 117 between area network 110 and an adjacent or neighboring network 110 to which the packet can be sent.

In 730, method 700 includes pointing a customer MAC (CMAC) address to the service at the first node. Operation 730 can be performed by virtual nodes 116 or boundary nodes 117. In some aspects, the CMAC can be stored in or be part of an LSDB for virtual nodes 116 or boundary nodes 117. The CMAC address can be an address for the service. The first node can be a node that offers the service.

In 740, method 700 synchronizes the CMAC address of the service of the boundary nodes. This can be performed by virtual nodes 116 or boundary nodes 117. Synchronizing the CMAC address allows virtual nodes 116 or boundary nodes 117 to associate the encapsulation with the first node and ensures that the packets can be properly forwarded from virtual nodes 116 or boundary nodes 117 to virtual node 116 or boundary node 117 that is configured to forward the packet across the network boundary. In some aspects, synchronizing the CMAC address of the service can include synchronizing the CMAC for the service in the LSDB for the different virtual nodes 116 or boundary nodes 117 in the first network.

In 750, method 700 includes translating the packet encapsulation. Translating the packet encapsulation can be performed by virtual nodes 116 or boundary nodes 117. Translating the packet encapsulation can involve changing the source address to boundary node 117 or virtual node 116 in a network 110 across the network boundary. This virtual node 116 can be a node that represents the first network to the network across the boundary. It can also include updating the destination address to be based on the new source address and the I-SID for the service.

In 760, method 700 forwards the packet to a second node in a second network. The forwarding can be performed by virtual node 116 or boundary node 117. The second network can be network 110 connected to the first network 110 in the multi-area network and which is accessible through the primary virtual node or the primary boundary node. The second node can be a destination node for the packet or a further boundary node 117 or virtual node 116 that connects to another network 110. The translated packet source can allow the other network 110 to properly route the packet based on the translated encapsulation because the source node is a node that is present in the topology of the other network 110. In some aspects, operation 760 forwards the packet with virtual node 116 that is the source node in the second encapsulation.

In some aspects, operations of method 700 can be repeated based on the destination of the packet being across more than one network boundary. For example, operation 760 can include performing operation 720 and method 700 can further perform operations 730-760 for the packet at a boundary between a first neighboring network 110 and a second neighboring network 110 connected to first neighboring network 110. In such aspects, since the operations are repeated, the references to the various networks are updated to account for sending the packet through first neighboring network 110 to second neighboring network 110.

Figure 8:
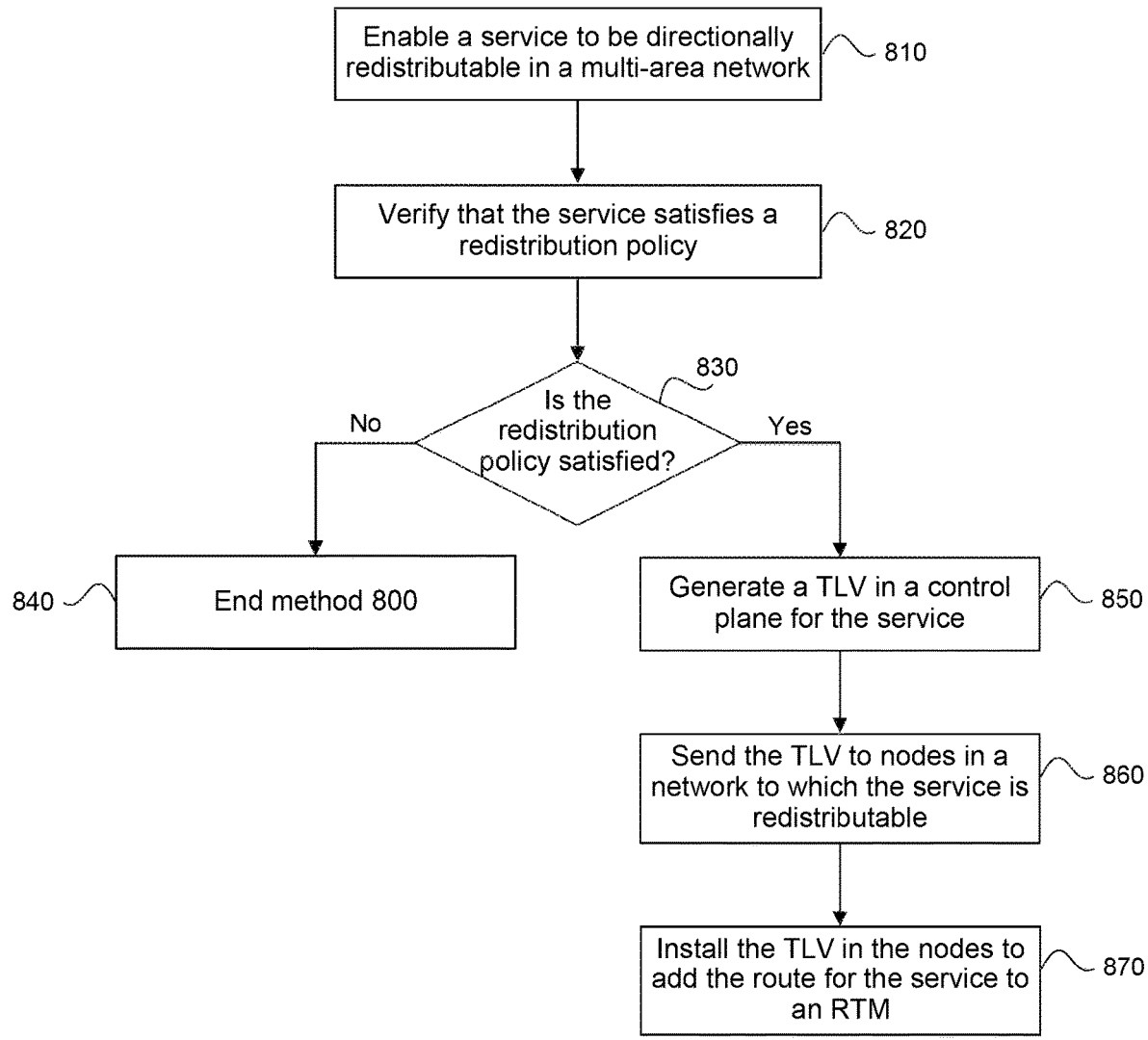
FIG. 8 is a flow chart illustrating a method for configuring and redistributing Layer 3 services in a multi-area network, according to some aspects.

FIG. 8 is a flow chart illustrating a method 800 for configuring and redistributing Layer 3 services in a multi-area network, according to some aspects. The method 800 can be employed some in aspects of the multi-area networks described herein, such as multi-area networks 100, 400, and 500. In some aspects, method 800 can be applied to services that can be redistributed based upon an IP address.

In 810, method 800 includes enabling a service to be directionally redistributable in a multi-area network (e.g., multi-area network 400). The service can be a Layer 3 service. A directionally redistributable service can be enabled or configured as redistributable in three different ways across a boundary between two networks (e.g., network A 110A and network B 110B in multi-area network 400). First, the service can be enabled to cross the boundary between the two networks in a direction passing from the first network (e.g., network A 110A) to the second network (e.g., network B 110B). Second, the service can be enabled to cross the boundary between the two networks in the opposite direction, that is from the second network (e.g., network B 110B) to the first network (e.g., network A 110A). Third, the service can be enabled to cross the boundary in both directions. The service can also be disabled from crossing a network boundary. The service can be enabled or disabled by a network offering the service or by boundary nodes between two networks.

The service can be enabled at a single or multiple boundaries. The direction that the service is enabled for redistribution can vary among different boundaries. For example, if three networks 110 are connected in a multi-area network, such as that depicted in FIG. 5 for networks A 110A, B 110B, and D 110D in multi-area network 500, the service can be, as a non-limiting example, redistributable across the boundary between network A 110A to network B 110B and not be redistributable across the boundary between network B 110B and network D 110D.

In 820, the method 800 includes verifying that the service satisfies a redistribution policy. The redistribution policy can be a Layer 3 redistribution policy. The redistribution policy can be verified using a redistribution policy filter, which is configured to filter request for services based on whether the service can cross the boundaries necessary to be routed to the target. The redistribution policy filter can be a software filter. In some aspects, the redistribution policy filter checks if the service is configured to be redistributable across a boundary. The redistribution policy and the redistribution policy filter can be implemented in control plane 210 for the multi-area network.

In 830, if the redistribution policy is not satisfied, then method 800 proceeds to operation 840. If the redistribution policy is satisfied, then method 800 proceeds to operation 850.

In 840, method 800 ends.

In 850, method 800 includes generating a TLV in a control plane 210 for the service. In some aspects, the TLV can include information about the redistribution settings for a service. For example, the TLV can include a format including one or more of an area ID of the area (e.g., network 110) where the service is offered, one or more neighbor area IDs of the area that are neighbors of the area where the service is offered and to which the service is redistributable, and one or more metrics for each one of one or more neighbor area IDs. In some examples, one or more metrics for a neighbor area can be optional and can include parameters for reaching that neighbor area.

In 860, method 800 includes sending the TLV to nodes in a network 110 to which the service is redistributable. The TLV can be sent by control plane 210 to the nodes. The nodes can be virtual nodes 116 or boundary nodes 117 in network 110. In some aspects, the TLV can be sent to each network to which the service is redistributable.

In some aspects, operation 860 can include sending the TLV to boundary node 117 as a policy update. The policy update can be configured to enable the service to be redistributable across network boundaries. Boundary node 117 can receive the policy update.

In 870, method 800 includes installing the TLV in the nodes to add a route for the service in an RTM. For example, the TLV can be installed in virtual nodes 116 or boundary nodes 117. The route can be installed in an RTM for each network 110 that the service is enabled to enter. The route can be installed in RTMs of boundary nodes 117 for each of networks 110 on the boundaries that the service is enabled to cross. Multiple routes can be installed in each RTM based on the different configurations for redistribution enabled for a given service. The routes can be defined such that the service can only pass the boundaries in the directions that the service is enabled to be redistributed.

Method 800 allows the implementation of a Layer 3 redistribution policy without all of the individual nodes (e.g., interior nodes 111, virtual nodes 116, or boundary nodes 117) in each network knowing the entire multi-area network topology or policy. Instead, boundary nodes 117 or virtual nodes 116 can maintain the topology and enact the policy to allow services to be routed in Layer 3 according to the implemented aspect of the redistribution policy. This allows the multi-area network to maintain the flexibility and improved performance of aspects described herein.

Figure 9:
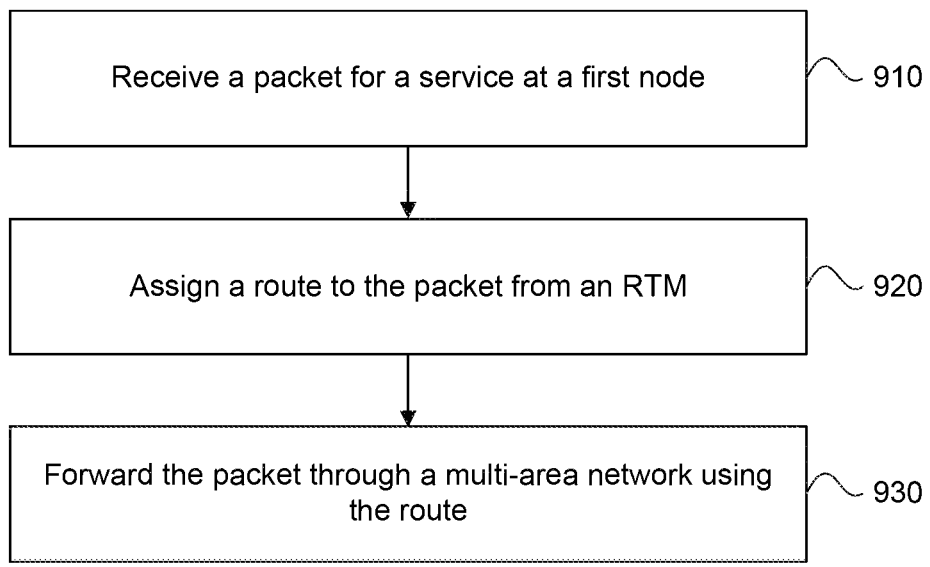
FIG. 9 is a flow chart illustrating a method for providing Layer 3 services in a multi-area network, according to some aspects.

FIG. 9 is a flow chart illustrating a method 900 for providing Layer 3 services in a multi-area network, according to some aspects. The services can be sent across a boundary between two networks 110 in the multi-area network by virtual nodes 116 or boundary nodes 117. In some aspects, method 900 relies on the configuration of Layer 3 services for redistribution provided in method 800. In some aspects, method 900 can be applied to services that can be redistributed based upon an IP address.

In 910, method 900 includes receiving a packet for a service at a first node. The packet can be received from a host, such as host A 410 in FIG. 4. The packet can be a packet for utilizing the service. The first node can be a packet offering the service. Host A 410 can access the service with a target destination, such as host B 420. As shown in FIG. 4, a network boundary is between host A 420 and host B 420.

In 920, method 900 includes assigning a route to the packet from an RTM. The first node can check the RTM for routes between the first node and the target destination. If such a route exits, the first node can assign the route to the packet.

In some aspects, the service can be configured to be redistributable according to method 800. In such aspects, a route should be installed in the RTM as described in method 800 and the route assigned can be the installed route.

In some aspects, the service can be configured not to be redistributable or configured to be redistributable according to method 800, but not across the boundary between the first node and the target destination. In such aspects, the first node can discard the packet and method 900 does nothing else. In some aspects, this is in response to not finding a route for the packet from the first node to the target destination in the RTM.

In 930, method 900 includes forwarding the packet through the multi-area network using the route. The service can be forwarded by the node (e.g., interior node A 111A) offering the service and networks 110 in the multi-area network through which the service is to pass. For example, as depicted in FIG. 4, interior node A 111A can forward the packet to boundary nodes 117 or virtual nodes 116 of network A 110A, which forward the packet across the boundary into network B 110B, which then forwards the packet through network B 110B to the target destination at interior node B 111H. In some aspects, forwarding the packet can include translation of the IP configuration or header of the packet at virtual nodes 116 or boundary nodes 117 based on the Layer 3 service differences between the networks on either side of the boundary.

Figure 10:
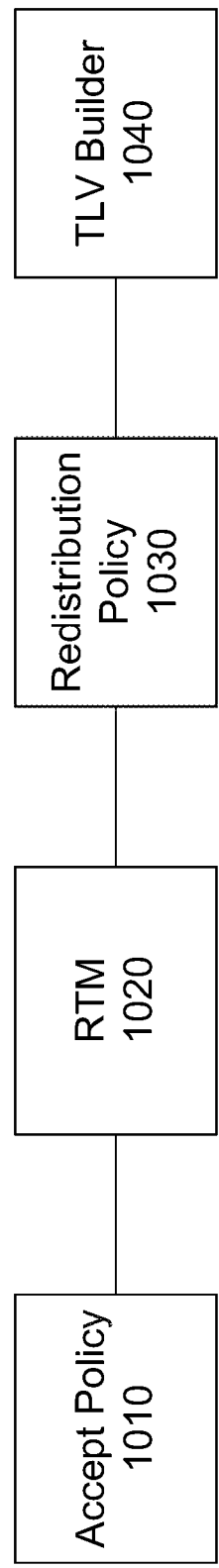
FIG. 10 illustrates a block diagram of a routing table manager (RTM)-based redistribution system, according to some aspects.

FIG. 10 illustrates a block diagram of an RTM-based redistribution system 1000, according to some aspects. The RTM-based redistribution system 1000 can redistribute routes from a first network to neighboring networks. The RTM-based redistribution system 1000 has an accept policy 1010, an RTM 1020, a redistribution policy 1030, and a TLV builder 1040. In some aspects, the RTM-based redistribution system 1000 can be implemented in software on one or more nodes, computers, or processors one or more networks in the multi-area network. In some aspects, the RTM-based redistribution system 1000 can be implemented in the control plane for the multi-area network.

In some aspects, accept policy 1010 can be a computer, node, or software-implemented system that manages settings or configurations for redistributing nodes and routes in a multi-area network. Accept policy 1010 can implement a redistribution policy based up on IP addresses. For example, accept policy 1010 can be a Layer 3 redistribution policy for redistribution of services across a multi-area network. Accept policy 1010 can implement a redistribution policy filter for filtering service redistribution. In some aspects, accept policy 1010 can enable services to be redistributable and send routes to RTM 1020 for installation.

As an example, accept policy 1010 can perform some or all of operations of method 800 as described above. In such examples, an aspect of accept policy 1010 can be one or more boundary nodes 117 or virtual nodes 116 configured to do one or more of the following: implement a redistribution policy or redistribution policy filter, apply the redistribution policy to service packets, and select a route for accepted service access requests.

In some aspects, RTM 1020 can be an RTM for installing, storing, and redistributing routes for redistribution of services across network boundaries in a multi-area network. RTM 1020 can be a single RTM for an entire multi-area network or a set of RTMs hosted locally in boundary nodes 117 or virtual nodes 116 in individual networks 110 of the multi-area network. In some aspects where RTM 1020 is made up of several distributed RTMs, each distributed RTM in RTM 1020 can store the same routes or different routes, depending on the needs of the individual network 110 making use of the distributed RTM. RTM 1020 can also provide routes.

In some aspects, RTM 1020 can be one or more boundary nodes 117 or virtual nodes 116 configured to do one or more of the following: install routes in one or more RTMs, receive selected routes from accept policy 1010, provide a list of routes to the accept policy for verification, provide selected routes for services to be redistributed, and send routes to redistribution policy 1030 for redistribution in the multi-area network.

In some aspects, redistribution policy 1030 can be a computer, node, or software-implemented system that manages settings or configurations for redistributing nodes and routes in a multi-area network. Redistribution policy 1030 can redistribute routes to different networks 110 across a multi-area network. The routes can be redistributed to distributed RTMs in each of the different networks. Redistribution policy 1030 can request routes or RTM information from RTM 1020 and then send the routes or RTM information to TLV builder 1040.

Redistribution policy 1030 can have a separate policy or protocol from accept policy 1010. This advantageously allows RTM-based redistribution system 1000 to make use of standard RTM redistribution mechanisms without disrupting the protocol or policy used by accept policy 1010. In some aspects, the policy or protocol used by accept policy 1010 is a policy or protocol for a first network in a multi-area network and the different policy or protocol used by redistribution policy 1030 is a policy or protocol for a neighboring network connected to the first network by boundary node 117 or virtual node 116.

In some aspects, TLV builder 1040 can be a computer, node, or software-implemented system that build TLVs for redistributing route or RTM information to other nodes in a multi-area network. These other nodes can be in a neighboring network to a network with boundary node 117 or virtual node 116 that is operating as or providing accept policy 1010. In some aspects, TLV builder 1040 can be part of control plane 210. The TLV can include and topology information for routing the TLV to boundary nodes in the second network.

Figure 11:
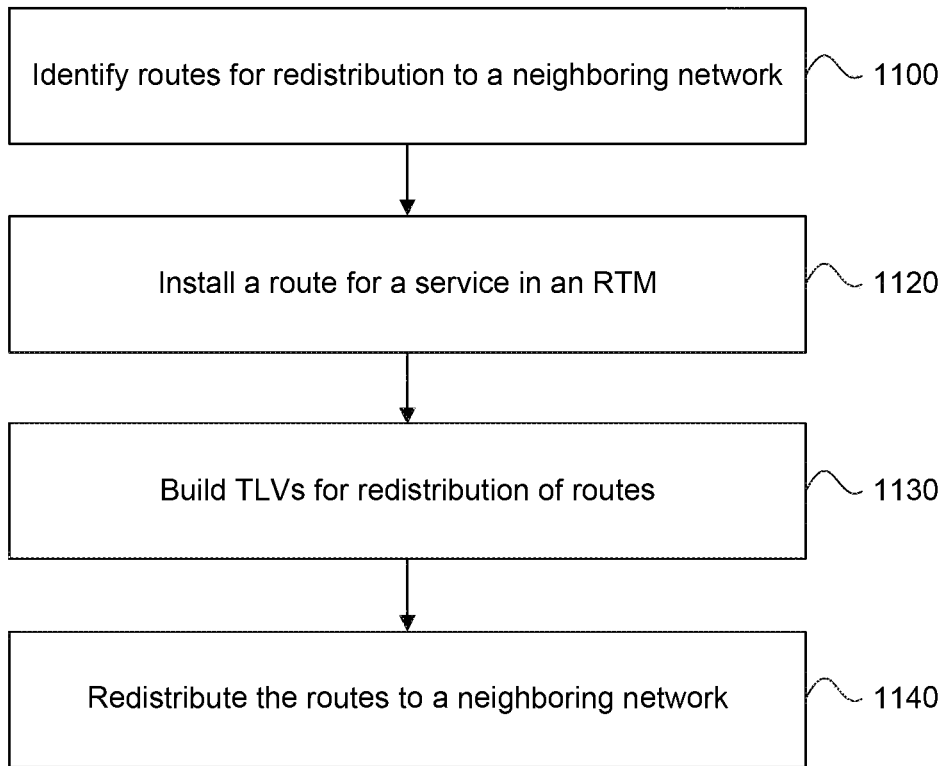
FIG. 11 is a flow chart illustrating a method for redistributing routes using an RTM, according to some aspects.

FIG. 11 is a flow chart illustrating a method 1100 for redistributing routes using an RTM, according to some aspects. Method 1100 can be implemented in some aspects of the multi-area networks in this disclosure, such as multi-area networks 100, 400, and 500.

In 1110, method 1100 includes identify routes for redistribution to a neighboring network. The routes identified can be stored in the RTM or can be a new route for a service that was enabled, such as by method 800. Operation 1110 can be performed by boundary nodes 117 where the RTM with the routes is located or stored or can be performed by control plane 210. Redistribution policy 1030 can perform operation 1110.

In 1120, method 1100 includes installing a route for a service in an RTM. The service can be redistributable based on IP addresses. The service can be a Layer 3 service. The service can be offered in a first network (e.g., network A 110A). The route can be installed in RTMs of boundary nodes 117 (e.g., boundary node AB1 117B and boundary node AB2 117A) in the first network on boundary node 117 between the first network and the second network. In some aspects, RTM 1020 can perform operation 1120.

In some aspects, the route installed in operation 1110 can be a route for a service enabled for redistribution. For example, a route enabled in method 800 can be enabled to be directionally redistributable across a boundary between the first network and a second network (e.g., network B 110B) of the multi-area network (e.g., multi-area network 400).

In some aspects, the route installed in operation 1110 can be a route redistributed from another network. For example, the route can be a route redistributed in operation 1140 from another network.

In 1130, TLVs are built for redistribution of the routes. The TLV builder 1040 can perform operation 1130. The TLV can include the routes identified in step 1110. In some aspects, the TLV can include topology information for routing the TLV to boundary nodes in the second network.

In 1140, routes are redistributed to a neighboring network. The routes can be redistributed by redistribution policy 1030. In some aspects, the routes can be redistributed by forwarding the TLVs built in operation 1130 through the neighboring network to boundary nodes 117 in the neighboring network. In some aspects, the TLVs can be forwarded from the control plane 210 to the boundary nodes 117, which then can flood the TLVs throughout the neighboring network to update the RTM(s) in that network. Operation 1140 can include installing the routes in the boundary nodes 117 in the neighboring network.

Figure 12:
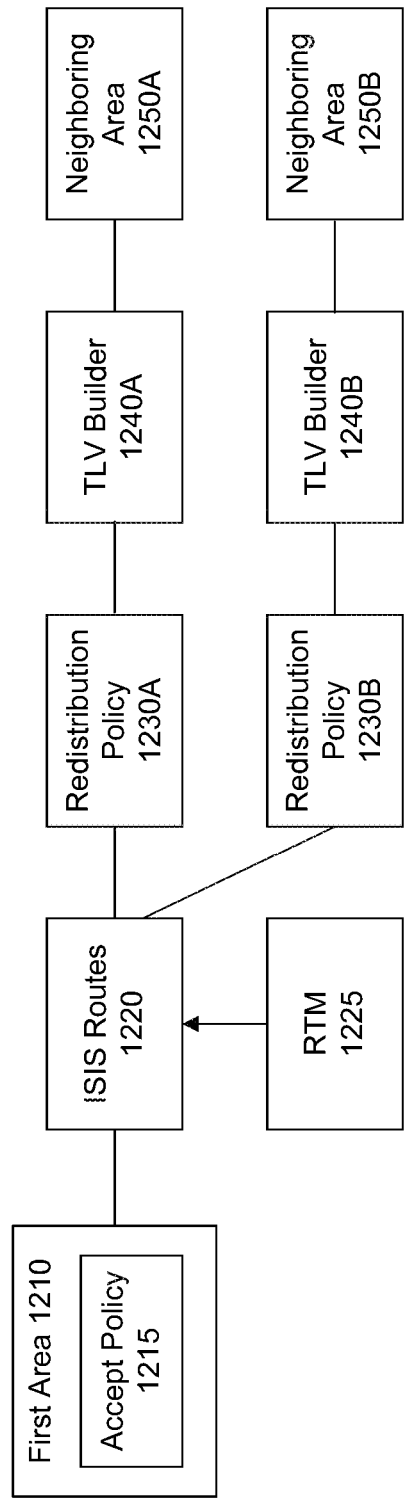
FIG. 12 illustrates a block diagram of a route shadow copy-based redistribution system, according to some aspects.

FIG. 12 illustrates a block diagram of a redistribution system 1200 using route shadow copy-based redistribution, according to some aspects. Redistribution system 1200 can redistribute routes from a first area 1210 to neighboring areas 1250A and 1250B (collectively referred to as "neighboring areas 1250") in a multi-area network (e.g., multi-area networks 100, 400, or 500). Redistribution system 1200 also has ISIS routes 1220, an RTM 1225, redistribution policy 1230A and 1230B (collectively referred to as "redistribution policy 1230"), and TLV builders 1240A and 1240B (collectively referred to as "TLV builders 1240"). In some aspects, redistribution system 1200 can be implemented in software on one or more nodes, the control plane 210, computers, or processors one or more networks in the multi-area network.

In some aspects, first area 1210 can be a network 110 (e.g., network A 110A) where a service is hosted. First area 1210 can implement an accept policy 1215 for providing redistribution of services across the multi-area network. Accept policy 1215 can be a redistribution policy based upon an IP address. For example, accept policy 1215 can be a Layer 3 redistribution policy for accepting redistribution of services across a multi-area network. First area 1210 can implement a redistribution policy filter for filtering service redistribution. In some aspects, first area 1210 can enable services to be redistributable and install routes in an RTM 925 for first area network. As an example, first area 1210 can perform some or all of method 800 as described above. First area 1210 can access the ISIS routes 1220.

In some aspects, RTM 1225 can be an RTM for installing, storing, and redistributing routes for redistribution of services across network boundaries in a multi-area network. The RTM 1225 can be hosted in boundary nodes 117 or virtual nodes 116 in first area 1210. Each boundary node 117 or virtual node 116 can host an RTM 1225 for redistribution system 1200.

In some aspects, RTM 1225 can be one or more boundary nodes 117 (e.g., boundary nodes 117 in first area 1210) or virtual nodes 116 (e.g., virtual nodes 116 in first area 1210) configured to do one or more of the following: install routes in the RTM 1225, receive selected routes from the ISIS routes 1220, provide a list of routes to the accept policy 1215 for verification, and provide selected routes for services to be redistributed to the ISIS routes 1220.

In some aspects, ISIS routes 1220 are a route shadow copy of the installed ISIS table. The installed ISIS table can be installed as the best routing table for the multi-area network. The routing table can be considered the best routing table based on a metric for evaluating routes. In some aspects, the metric can be based on an SPF computation of the route length and the best routes can be the shortest routes.

The ISIS routes 1220 can be accessed by the RTM 1225. The ISIS routes 1220 can be accessed by first area 1210 as part of installing routes in the RTM 1225 for first area 1210. The ISIS routes 1220 can provide routes to the RTM 1225 based on services enabled to cross boundaries between networks 110 in the multi-area network. If a new route is needed that is not in the ISIS routes 1220, the RTM 1225 can identify the new route from the network topology and provide it to the ISIS routes 1220 to update the available routes.

In some aspects, redistribution policy 1230 can be a computer, node, or software-implemented system that manages settings or configurations for redistributing routes in a multi-area network. In some aspects, redistribution policy 1230 can be part of the control plane 210. The redistribution policy 1230 can redistribute routes to neighboring areas 1250. The routes can be redistributed to an RTM in each of the different networks (e.g., neighboring areas area 1250A). The redistribution policy 1230 can request routes or RTM information from the ISIS routes 1220 and then send the routes or RTM information to the TLV builder 1240.

Each redistribution policy 1230 can have a separate policy or protocol from the accept policy 1215 and each other redistribution policy. In some aspects, redistribution policy 1230 is the same for at least some areas (e.g., first area 1210 or neighboring areas 1250). As a non-limiting example, accept policy 1215 can have a first redistribution policy and redistribution policy 1230A can be the same policy, while redistribution policy 1230B can be a different redistribution policy.

In some aspects, TLV builders 1240 can be a computer, node, or software-implemented system that build TLVs for redistributing route or RTM information to other nodes in a multi-area network. These other nodes can be in a neighboring area 1250. In some aspects, TLV builders 1240 can be part of control plane 210.

In some aspects, ISIS routes 1220 can provide the redistribution policies 1230 with routes to be redistributed to neighboring areas 1250. The redistribution policies 1230 can provide the TLV builders 1240 with the necessary route or RTM information to build TLVs. The TLVs can then be sent by redistribution policies 1230 to respective neighboring areas 1250, where the routes can be installed in the respective RTMs for neighboring areas 1250.

In some aspects, redistribution system 1200 does not use RTM 1225 for redistribution of routes, but instead relies on ISIS routes 1220. This can prevent redistribution system 1200 from using the standard RTM redistribution features. However, because routes stored in the ISIS routes 1220 are routes that pass accept filters for the redistribution policy, in some aspects, accept policy 1215 and some or all of redistribution policies 1230 can implement the routes without performing a verification on the route.

Figure 13:
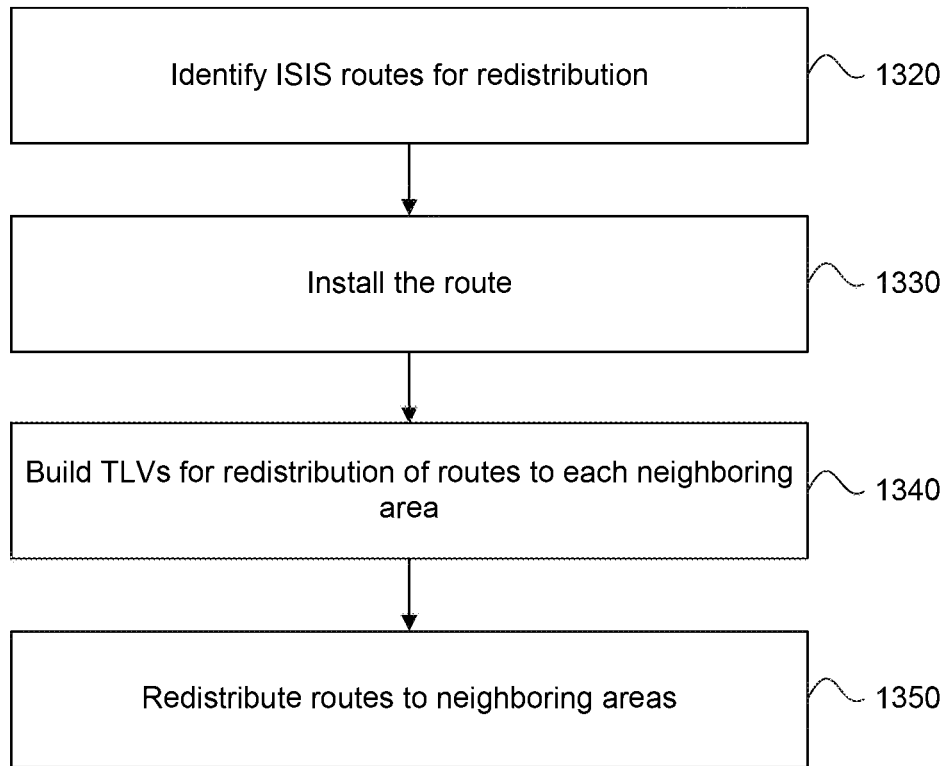
FIG. 13 is a flow chart illustrating a method for redistributing routes using a route shadow copy, according to some aspects.

FIG. 13 is a flow chart illustrating a method 1300 for redistributing routes using a route shadow copy, according to some aspects. Method 1300 can be implemented in aspects of multi-area networks in this disclosure, such as multi-area networks 100, 400, or 500.

In 1310, method 1300 includes identifying a route for a service. The service can be redistributable based up on an IP address. For example, the service can be a Layer 3 service. The service can be offered in first area 1210. The route can be identified based on accept policy 1215. First area 1210 can determine if the route is available in the ISIS routes 1220. In aspects where the route is not present in the ISIS routes 1220, the ISIS routes 1220 can communicate with the RTM 1225 to identify if there is a valid route. This route can then be sent from the RTM 1225 to the ISIS routes 1220 and be identified as the route for the service.

In 1320, method 1300 identifies ISIS routes 1220 for redistribution. The routes identified can be stored in the ISIS routes 1220 or a new route for a service that was enabled, such as by method 800. In some aspects, the routes can be identified by the boundary nodes 117 that store RTM 1225.

In 1330, method 1300 includes installing a route for a service in an RTM. The route can be installed in the RTM(s) 1225 of boundary nodes 117 or virtual nodes 116 of first areas 1210. The RTM 1225 can receive the route from ISIS routes 1220. The route can be installed in boundary nodes 117 or virtual nodes 116 of first area 1210 that are on boundaries that the service is enabled to be redistributable across.

In 1340, TLVs are built for redistribution of the routes to each neighboring area. TLV builders 1240 can perform operation 1340. The TLV can include the routes identified in operation 1330. In some aspects, the TLV can include topology information for routing the TLV to boundary nodes 117 or virtual nodes 116 in neighboring areas 1250. Each TLV builder 1240 (e.g., TLV builder 1240A) can build TLVs for routes identified for redistribution to neighboring area 1250 associated with TLV builder 1240. In some aspects, different routes can be redistributed to each neighboring area 1250.

In 1350, routes are redistributed to neighboring areas 1250. The routes can be redistributed by the redistribution policy 1230 for a given neighboring area 1250. For example, redistribution policy 1230A can redistribute the routes to neighboring area 1250A, but not neighboring area 1250B. In some aspects, the routes can be redistributed by forwarding the TLVs built in operation 1340 through the multi-area network to boundary nodes 117 or virtual nodes 116 in neighboring area 1250. In some aspects, the TLVs can be forwarded by control plane 210. Operation 1350 can include installing the routes in the RTM of respective neighboring areas 1250.

Figure 14:
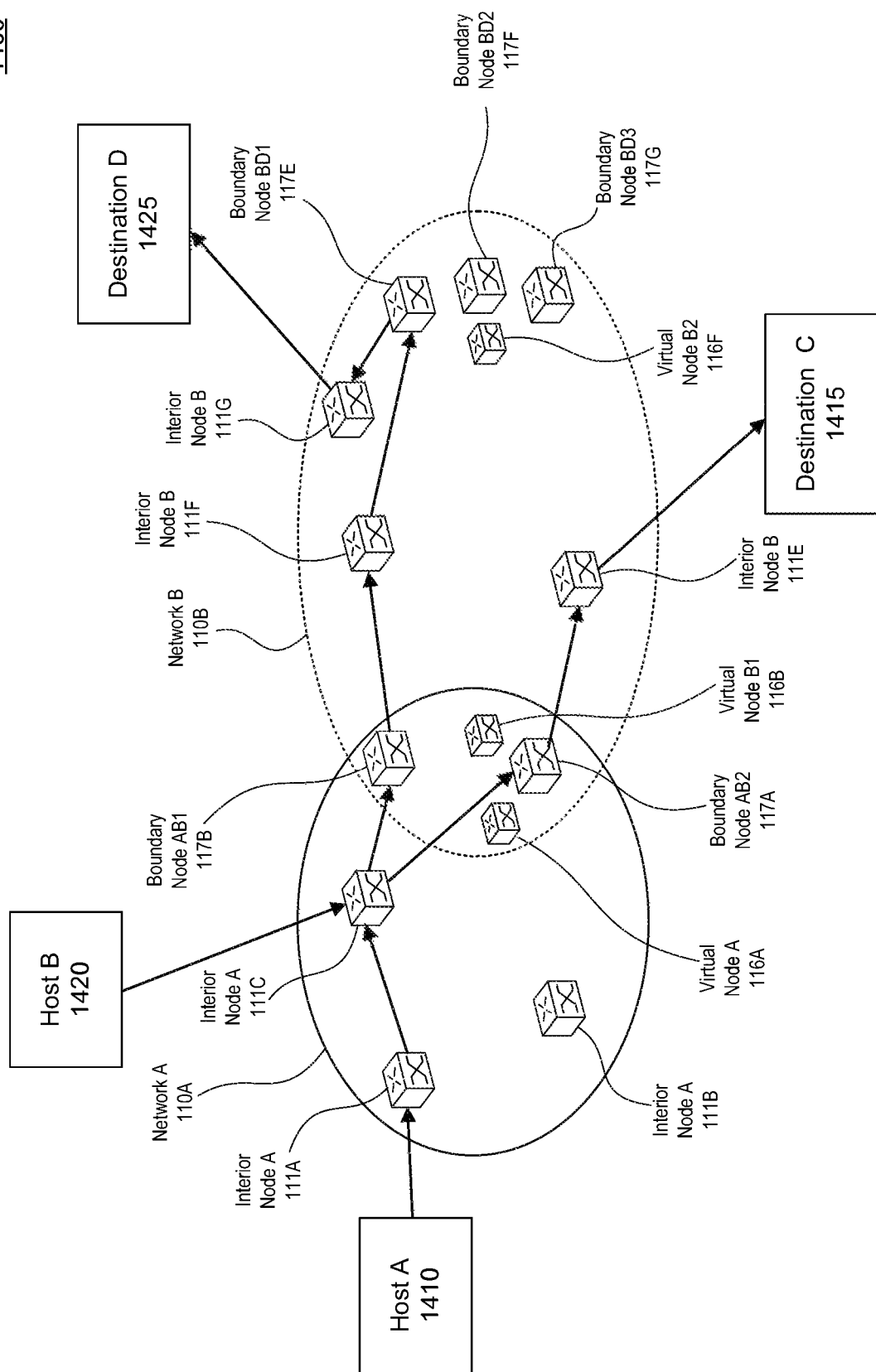
FIG. 14 illustrates a block diagram for a multi-area network for multicast over SPB (MCoSPB) redistribution, according to some aspects.

FIG. 14 illustrates a block diagram for a multi-area network 1400 for MCoSPB redistribution, according to some aspects. Multi-area network 1400 in FIG. 14 is similar to multi-area networks 100, 400, and 500 in FIGS. 1, 4, and 5, respectively.

Multi-area network 1400 can have network A 110A connected to network B 110B. Network A 110A has interior nodes A 111A-C, boundary node AB1 117B, boundary node AB2 117A, and virtual node B1 116B. Network B 110B has interior nodes B 111E-G and virtual node A 116A. Network B 110B can share boundary node AB1 117B and boundary node AB2 117A with network A 110A. The nodes (e.g., interior nodes 111, virtual nodes 116, and boundary nodes 117) can have the same aspects and features of the nodes with the same labels for multi-area network 100 in FIG. 1.

Multi-area network 1400 can be accessed by host A 1410, host B 1420, destination C 1415, and destination D 1425. This can include multi-area network 1400 providing network services to a host, a host accessing a service in multi-area network 1400, and sending or receiving data from a host to multi-area network 1400.

The interior nodes 111 in multi-area network 1400 can offer services, as described elsewhere in this disclosure. These services can be available in the network 110 (e.g., network A 110A) where the interior node 111 (e.g., node A 111A) is located or can be available across network boundaries. For example, node A 111A in network A 110A can offer a service X. As a non-limiting example, service X can involve transmitting data through multi-area network 1400 from source host (e.g., host A 1410) to a destination host (e.g., destination D 1425).

In some aspects, service X is blocked from crossing network boundaries and will only be available in network A 110A. If host A 1410 accesses a service X to send data to destination D 1425, multi-area network 1400 will discard a stream from host A 1410 for the service. This can be accomplished by node A 111A verifying that destination D 1425 satisfies a multi-area network policy. When interior node A 111A checks the multi-area network policy for the service X and identifies that it cannot cross network boundaries, interior node A 111A can discard a stream attempting to cross such boundaries. If host A 1410 accesses service X to send data to host B 4120, multi-area network 1400 can provide access, as no network boundary is crossed. This can be accomplished by interior node A 111B.

In some aspects, service X is redistributable across network boundaries and is available in more than one network 110 (e.g., network A 110A and network B 110B) of multi-area network 1400. In some aspects, service X can be a multicast service. Multicast services can assign I-SIDs for a service locally at a node offering a service (e.g., interior node A 111A).

As an example, service X can be offered at interior node A 111A and service Y can be offered at interior node A 111C. Both service X and service Y can be multicast services that are redistributable across the boundary between network A 110A and network B 110B. Host A 1410 can access service X with a destination of destination C 1415. Host B 1420 can access service Y with a destination of destination D 1425. Since both service X and service Y are redistributable across the boundary, multi-area network 1400 can provide host A 1410 and host B 1420 access to the respective services.

According to multicast protocol, node A 111A can label a first stream for service X as originating at node A 111A and providing a service with an I-SID. As a non-limiting example, the I-SID can be a string of letters and/or numbers, such as 16,000,000. Similarly, node A 111C can label a second stream as originating at node A 111C and providing a service with an I-SID, such as 16,000,000. Multicast protocols label services locally at nodes. Since the nodes lack visibility into the labeling at other nodes, nodes can label services with the same I-SID.

Within network A 110A, the streams are distinguishable by their source node. However, upon crossing the boundary into network B 110B, a problem arises. First, the interior nodes in network B 110B have no knowledge of the nodes of network A 110A. This means that issues can arise with forwarding the streams, as the source node is unknown in network B 110B. In some aspects of the multi-area networks described herein, streams sent across the boundary between two networks originate at a virtual node 116 (e.g., virtual node B1 116B) in a neighboring network (e.g., network B 110B). Thus, in some aspects, one solution is to have boundary nodes 117 relabel the first and second streams as originating at virtual node B1 116B. Network B 110B can then properly route the streams.

While this can solve the routing problem, a new problem is created. Because both streams have the same I-SID, the streams are now labeled identically and cannot be differentiated. This can be solved by also changing the I-SID when streams cross the boundary. In some aspects, the control plane 210 can store the I-SIDs assigned to the services in each network 110 of the multi-area network. The boundary nodes 117 can change the I-SID as necessary at the boundary, resulting in streams with different I-SIDs for services, allowing the services to be differentiated.

Returning now to the example in FIG. 14, the first stream can proceed along the path indicated by the arrows to boundary node AB1 117B and boundary node AB2 117A. Here, both streams are relabeled as originating from virtual node A 116A. The first stream can be assigned a new I-SID of 16,000,010. Because this I-SID has been used, the second stream can be assigned a different new I-SID of 16,000,011. The streams can now be distinguished in network B 110B. In some aspects, the boundary nodes 117 also store a mapping of the change in the I-SIDs and associated source nodes across the boundary. In some aspects, this mapping is provided to the boundary nodes 117 by the control plane 210, such as with a TLV including the mapping.

The streams are routed according to the routes to their destinations in network B 110B. The routes can be the shortest paths to the destinations. The first stream follows the path to node B 111E and destination C 1415, while the second stream follows the path to node B 111G and destination D 1425. Virtual node A 116A can be a software-implemented node, so while the streams originate from one or the other of boundary nodes 116 (e.g., boundary node AB1 117B), from the point of view of internal routing in network B 110B, the packets originate at virtual node A 116A.

Figure 15:
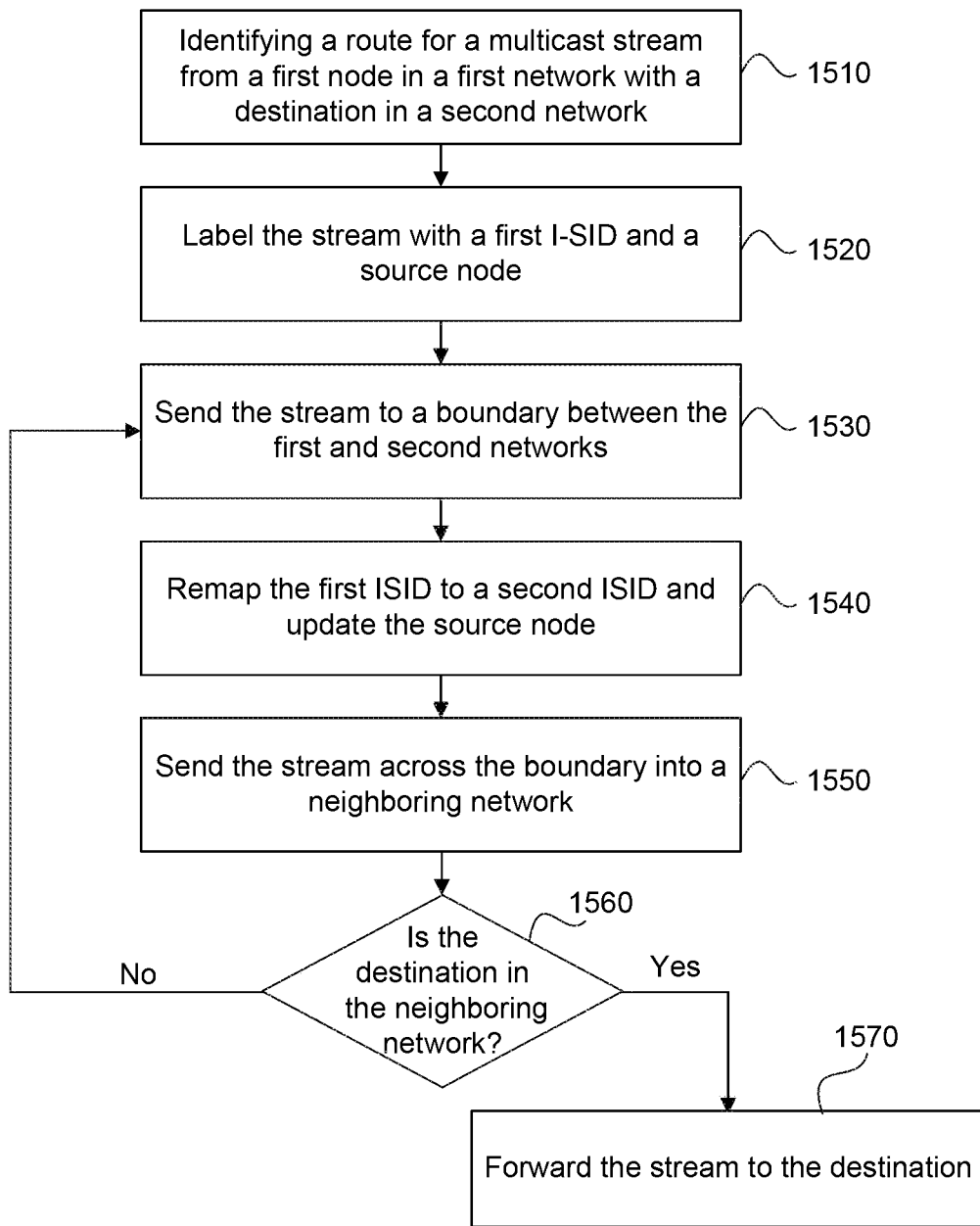
FIG. 15 is a flow chart illustrating a method for providing MCoSPB in a multi-area network, according to some aspects.

FIG. 15 is a flow chart illustrating a method 1500 for providing MCoSPB in a multi-area network, according to some aspects. Method 1500 can be employed in aspects of multi-area networks described herein, such as multi-area networks 100, 400, 500, and 1400.

In 1510, method 1500 includes identifying a route for a multicast stream from a first node in a first network with a destination in a second network. The route can be a route installed in a LSDB for the multicast stream that satisfies the redistribution policy for a multi-area network. The route can be identified by the first node (e.g., interior node A 111A).

In some aspects, the route can be verified prior to installing the route in the LSDB. In some aspects, the verification can be performed by the control plane 210. In some aspects, the verification can be performed by verifying that the multicast stream sent from the first node to the destination satisfies the redistribution policy.

In some aspects, the multicast stream can be configured not to be redistributable from the first node to the destination. In such aspects, the first node can discard the multicast stream.

In 1520, method 1500 includes labeling the stream with a first I-SID and a source node. The stream can be generated at a node (e.g., interior node A 111A) offering a service in the first network. The service can be a multicast stream. In some aspects, the service can be redistributable across boundaries in a multi-area network from the first network to the second network.

In some aspects, the labeling can be performed by the first node. In some aspects, the source node can be the first node. The source node label can be part of a tuple assigned to the packet that is configured according to a specific policy enforced in the network. The tuple can also include a multicast group IP address and a VRF ID. The tuple can be labeled with the first I-SID. In aspects where the service for the multicast stream is redistributable across at least some boundaries, the tuple and the first I-SID can be configured to satisfy a redistribution policy for redistribution across those boundaries. The redistribution policy can be a multicast streaming policy. In some aspects, the first I-SID can be locally assigned by the first node according to a multicast streaming policy. The multicast streaming policy can assign the first I-SID without knowledge of I-SIDs assigned for other multicast streams in the first network.

In 1530, method 1500 includes sending the stream to a boundary between the first and second networks. In some aspects, the stream can be sent by the first node or the network 110. The stream can be sent or forwarded from node to node (e.g., interior nodes 111 and boundary nodes 117) in the first network until the boundary is reached. In some aspects, reaching the boundary can occur when the stream reaches a boundary node 117 (e.g., boundary node AB1 117B) on the boundary.

In some aspects, the boundary can be shared between the first and the second networks. In some other aspects, the boundary can between the first network and a neighboring network that is not the second network. In such aspects, the second network can be reached by routing the stream through the neighboring network.

In 1540, method 1500 remaps the first I-SID to a second I-SID and updates the source node. The remapping can be performed by boundary node 117. The updated source node can be a node in the neighboring network or the second network discussed in operation 1530 that is treated, from the point of view of the neighboring network, as the source of the stream. In some aspects, the new source node can be a virtual node in the network across the boundary that represents the first network to the neighboring network. In some aspects, operation 1540 also updates the tuple. Updating the tuple can include updating the multicast group IP address and the VRF ID. In aspects where the service for the multicast stream is redistributable across at least some boundaries, the tuple can be updated to satisfy the redistribution policy.

In some aspects, the second I-SID is different from the first I-SID. In some aspects, the boundary nodes 117 on the boundary remap the I-SID with knowledge of other I-SIDs sent across the boundary. As discussed above, multicast streams from different nodes in the first network can have the same I-SIDs (because the multicast streaming policy locally assigns the I-SIDs and different nodes can assign the same I-SIDs). Since boundary nodes 117 remap the I-SID for each stream, they have knowledge of the I-SIDs that have been assigned. As a result, boundary nodes 117 can assign unique I-SIDs for each stream. In some aspects, the remapping is based in part on information from the control plane 210. In aspects where the service for the multicast stream is redistributable across at least some boundaries, the second I-SID can be remapped to satisfy the redistribution policy for redistribution across those boundaries.

In some aspects of the multi-area networks, a network can offer the same multicast stream from more than one node (e.g., interior nodes 111), such as by a host device changing its connection to the network 110 to a different node or switching a stream in progress from one host device to another. The control plane 210 can identify that the streams are from the same multicast stream. In some aspects, the boundary nodes 117 can be configured by the control plane 210 to remap the first I-SID for both source nodes to the same second I-SID.

In aspects where the service for the multicast stream is redistributable across at least some boundaries, the tuple and the first I-SID can be configured to satisfy a redistribution policy for redistribution across those boundaries. The redistribution policy can be a multicast streaming policy. In some aspects, the first I-SID can be locally assigned by the first node according to a multicast streaming policy. The multicast streaming policy can assign the first I-SID without knowledge of I-SIDs assigned for other multicast streams in the first network. In some aspects, operation 1550 allows the stream to be forwarded through a network across the boundary (e.g., the neighboring or second network).

In 1550, method 1500 includes sending the stream across the boundary into a neighboring network. Operation 1550 can be performed by the boundary node 117.

In 1560, if the destination node is not in the neighboring network, but another network, method 1500 loops back to operation 1530. If the destination node is in the neighboring network, method 1500 goes to operation 1570. In some aspects, operation 1560 can include determining if the destination node is present or if the neighboring network is the second network.

In aspects where method 1500 loops back to operation 1530, the operations can be repeated again in the new network with the boundary being the next boundary towards the second network. In some aspects, the operations are repeated with the source node being the second node. In some aspects, method 1500 can loop through several iterations to pass through the boundaries and networks between the first network and the second network in the multi-area network.

In 1570, method 1500 forwards the stream to the destination. Operation 1570 can be performed by the second network. The second network can treat or view the stream as originating at the second node.

Figure 16:
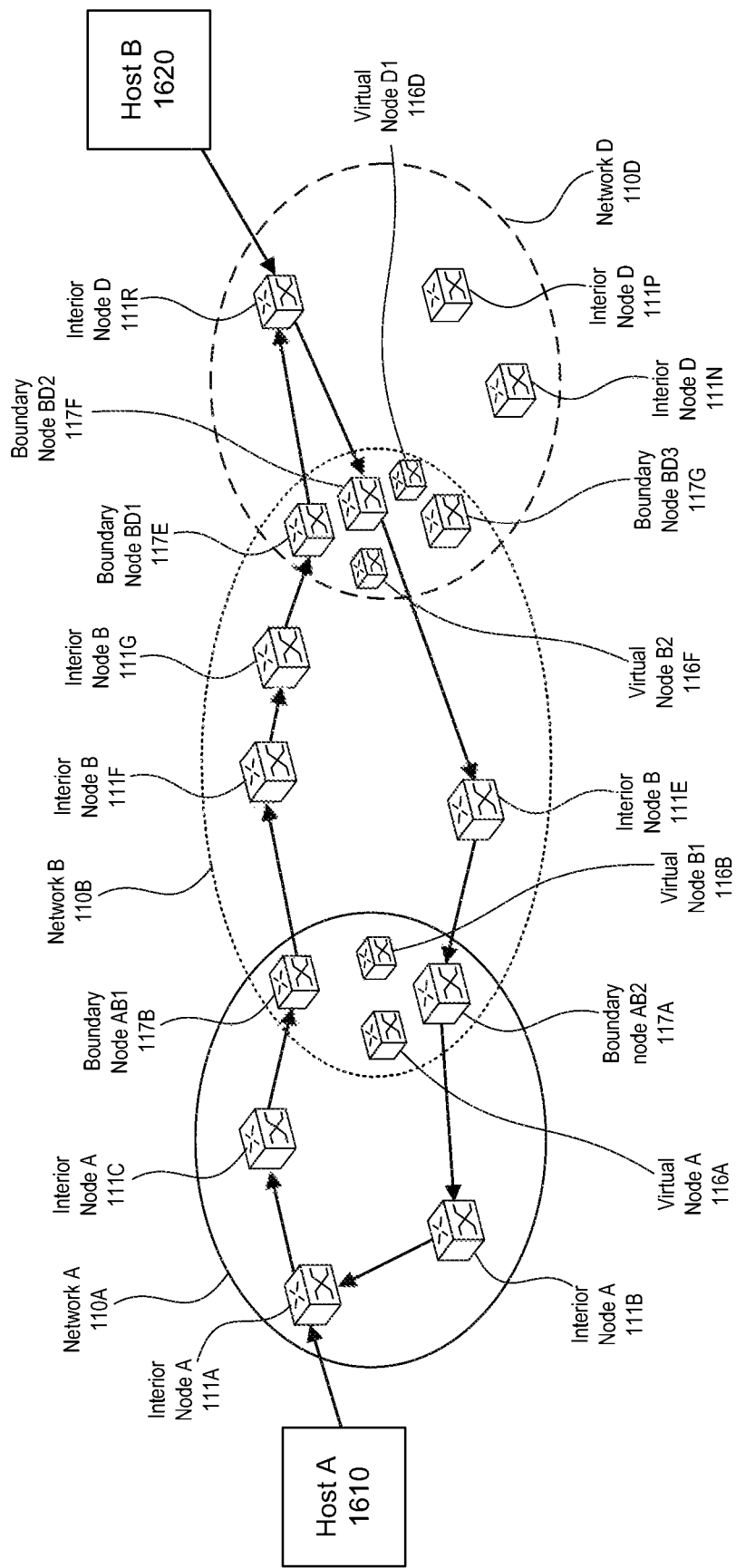
FIG. 16 illustrates a block diagram for a multi-area network with MAC synchronization, according to some aspects.

FIG. 16 illustrates a block diagram for a multi-area network 1600 with MAC synchronization, according to some aspects. Multi-area network 1600 in FIG. 16 is similar to the multi-area networks 100, 400, 500, and 1400.

Multi-area network 1600 can have network A 110A connected to network B 110B, which is further connected to network D 110D. Network A 110A has interior nodes A 111A-C, boundary node AB1 117B, boundary node AB2 117A, and virtual node B1 116B. Network B 110B has interior nodes B 111E-G, virtual node A 116A, virtual node D1 116D, boundary node BD1 117E, boundary node BD2 117F, and boundary node BD3 117G. Network B 110B can share the boundary node AB1 117B and boundary node AB2 117A with network A 110A. Network D 110D has interior nodes D 111N, 111P, and 111R, and virtual node B2 116F. Network D 110D can share boundary node BD1 117E, boundary node BD2 117F, and boundary node BD3 117G with network B 110B. The nodes (e.g., interior nodes 111, virtual nodes 116, and boundary nodes 117) can have the same aspects and features of the nodes with the same labels for multi-area network 100, 400, and 500 in FIGS. 1, 4, and 5, respectively.

Multi-area network 1600 can be accessed by host A 1610 and host B 1620. This can include multi-area network 1600 providing network services to a host, a host accessing a service in multi-area network 1600, and sending or receiving data from a host to multi-area network 1600.

The interior nodes 111 in multi-area network 1600 can offer services, as described elsewhere in this disclosure. These services can be available in network 110 where interior node 111 is located or can be available across network boundaries. For example, node A 111A in network A 110A can offer a service X. As a non-limiting example, service X can involve transmitting data through multi-area network 1600 to another host.

In some aspects, service X is blocked from crossing some network boundaries, but not others. For example, service X can be redistributable from network A 110 A to network B 110B, but not to network D 110D. If host A 1610 accesses to service X to send data to host B 1620, multi-area network 1600 will drop or discard the related network traffic. This can be accomplished by interior node A 111B identifying the absence of a route to host B 1620 in a routing table or LSDB or by applying a multi-area network redistribution policy filter. Because no valid route exists, interior node A 111B can drop the traffic from host A 1610.

In some aspects, service X is redistributable across network boundaries and is available in more than one network 110 of multi-area network 1600. In some aspects, service X can be redistributable based upon a MAC address or an I-SID. For example, service X can be a Layer 2 service. As a non-limiting example, service X can be a redistributable Layer 2 service, host A 1610 can access service X from node A 111A and have a target destination of node D 111R. In some aspects, service X is also offered for node D 111R and host B 1620 can access service X from that node and have a target destination of node A 111A.

In some aspects, multi-area networks, such as multi-area network 1600, forward packets for services across boundaries between networks, as described elsewhere in this disclosure. Boundary nodes 117 can become choke points for packet handling due to forwarding between boundary nodes 117, in addition to the handling of the forwarding across the boundary. The boundary nodes 117 can receive additional traffic due at least in part to a network protocol designating specific boundary nodes for specific directions of flow across the boundary or for specific services. The boundary node 117 can receive its normal traffic plus the forwarded traffic and can be overwhelmed.

In some aspects, asymmetrical bi-directional flow across the boundary can be problematic as well. As an example of asymmetry, the arrow path from host A 1610 to host B 1620 and back passes through different numbers of nodes. Other examples of asymmetry can include different path lengths, according to SPF calculations.

In some aspects, boundary nodes 117 (e.g., boundary node BD1 117E in a network (e.g., network B 110B) are configured to receive MAC learn TLVs for services originating or offered by nodes in other networks (e.g., network A 110A). The MAC learn TLVs can be received from the control plane 210 or other nodes. The MAC table for the boundary node 117 receiving the MAC learn TLV can be updated by the boundary node to add information about the service based on the MAC learn TLV. The boundary node 117 can then synchronize the MAC table with MAC tables for other nodes in the boundary node's network. In some aspects, this can include updating the MAC tables for other boundary nodes 117 to include the new information.

In some aspects, the MAC tables for interior nodes 111 in the network or virtual nodes representing the network to neighboring networks can be synchronized. In some aspects, all the interior nodes 111 and boundary nodes 118 in a network are synchronized. In some aspects, synchronizing the MAC tables allows the nodes to forward received packets from other networks without overwhelming boundary node 117, as each node will have the appropriate MAC table information to forward the packets on their own.

Figure 17A:
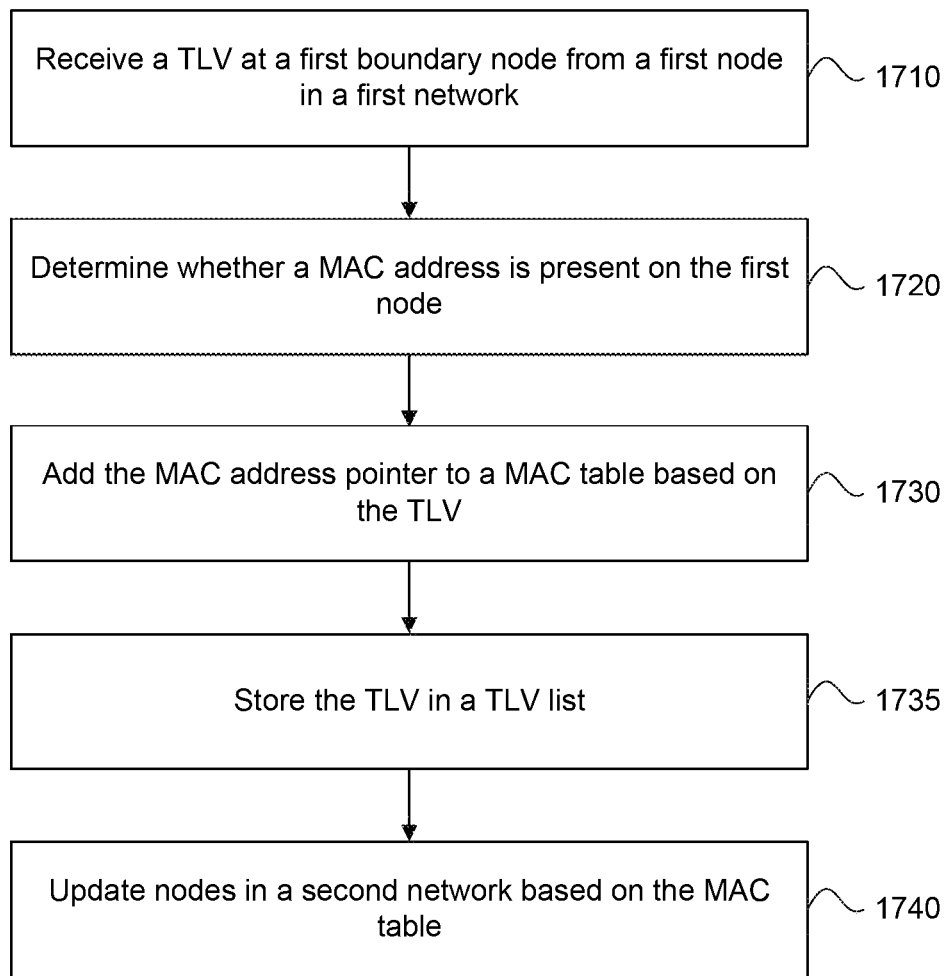
FIG. 17A is a flow chart illustrating a method for providing MAC synchronization in networks of a multi-area network, according to some aspects.

FIG. 17A is a flow chart illustrating a method 1700 for providing MAC synchronization in networks of a multi-area network, according to some aspects. Method 1700 can be employed in aspects of multi-area networks described herein, such as multi-area networks 100, 400, 500, 1400, and 1600.

In 1710, method 1700 includes receiving, at a first boundary node 117, a TLV from a first node in a first network. The first boundary node 117 (e.g., boundary node BD1 117E) can be located in a second network 110 (e.g., network B 110B). The first node (e.g., internal node D 111R) is part of the first network 110 (e.g., network D 110D). Both the first and second networks are in the multi-area network. In some aspects, the first node can offer a service based on a MAC address or an I-SID. The service can be a Layer 2 service.

In some aspects, the TLV can be a MAC learn TLV. The MAC learn TLV can include a customer MAC address and a backbone MAC destination address (BMAC-DA). The MAC learn TLV can be associated with the service.

In some aspects, the MAC learn TLV can be created by control plane 210. Control plane 210 can send the MAC learn TLV to boundary node 117. In some aspects, boundary node 117 can forward to the MAC learn TLV to other nodes. Control plane 210 can create the MAC learn TLV in response to a service being offered at the first node. Details on the creation of MAC learn TLVs are further described in method 1750 in FIG. 17B.

In 1720, method 1700 includes determining whether a MAC address is present on the first node. This can be determined based on the MAC learn TLV (e.g., by checking whether the MAC learn TLV indicates that the MAC address is present), by querying the first network as to whether the MAC address is present on the first node, by looking at stored routes for the service (e.g., checking whether routes exist for the service to the first node), or by referencing advertisements for the service in boundary nodes 117 or virtual nodes 116 (e.g., checking whether the service is advertised in a node using the MAC address). Advertising a service can include offering the availability of a service from one or more networks. In some aspects, advertising a service can be performed by including the MAC address in a MAC table. In some aspects, if the source node for the MAC learn TLV is a virtual node 116 in the neighboring network, operation 1720 identifies that the virtual node 116 is not the node offering the service. In aspects where the MAC address is absent, method 1700 proceeds to operation 1730. If the MAC address is present, method 1700 can proceed to operation 1735.

In 1730, method 1700 adds a MAC address pointer to a MAC table based on the TLV. In some aspects, the MAC address pointer is a customer MAC address pointer. The MAC address pointer can be a pointer with the MAC address pointing to the BMAC-DA for the service. The MAC table can be for the boundary node 117 in the local network.

In 1735, method 1700 stores the TLV in a TLV list. The TLV list can be used for keeping track of different TLVs for services. In some aspects, operation 1735 can be performed to store any TLV for the first node, even if that TLV is not used to add a MAC address pointer to the MAC table.

In 1740, method 1700 includes updating the local nodes based on the MAC table. In some aspects, this includes updating node MAC tables for other nodes in the local network. In some aspects, these can be any or all of interior nodes 111 and boundary nodes 117. In some aspects, virtual nodes 116 in neighboring networks representing the local network can also have their MAC tables updated. Updating the MAC tables can include adding the customer MAC address pointer that was added in operation 1730 to the other MAC tables.

Figure 17B:
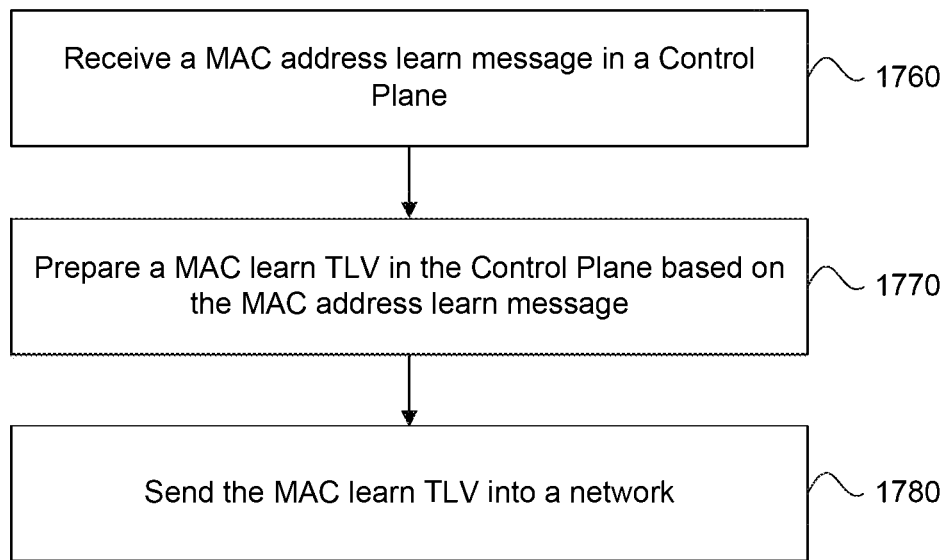
FIG. 17B is a flow chart illustrating a method for generating a MAC Learn TLV for MAC synchronization in a multi-area network, according to some aspects.

FIG. 17B is a flow chart illustrating a method 1750 for generating a MAC learn TLV for MAC synchronization in a multi-area network, according to some aspects. Method 1750 can be employed in aspects of multi-area networks described herein, such as multi-area networks 100, 400, 500,

1400, and 1600. Method 1750 can be performed to generate a MAC learn TLV that is used in method 1700.

In 1760, method 1750 includes receiving a MAC address learn message in a control plane 210. The MAC address learn message can come from datapath 220. The MAC address learn message can be generated in response to a service being advertised or offered in a node in a network 110 in a multi-area network.

In 1770, method 1750 includes preparing a MAC learn TLV in the control plane 210 based on the MAC address learn message. The MAC learn TLV can include a customer MAC address and a BMAC-DA. The MAC learn TLV can be associated with a service.

In 1780, method 1750 includes sending the MAC learn TLV into network 110. Control plane 210 can send the MAC learn TLV to a node, such as virtual node 116 or boundary node 117 in network 110.

Figure 18:
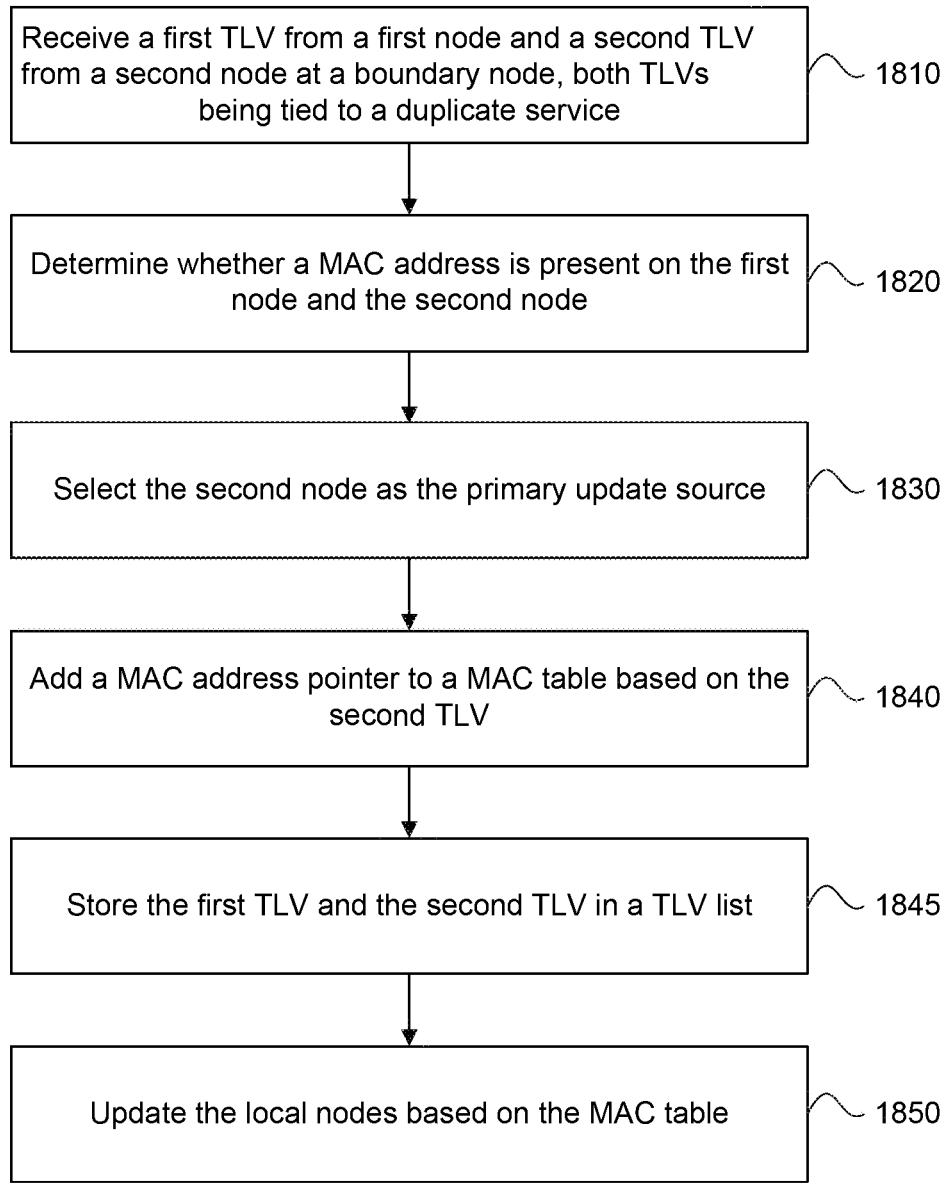
FIG. 18 is a flow chart illustrating a method for prioritizing MAC synchronization information in a multi-area network, according to some aspects.

FIG. 18 is a flow chart illustrating a method 1800 for prioritizing MAC synchronization information in a multi-area network, according to some aspects. Method 1800 can be employed in aspects of multi-area networks described herein, such as multi-area networks 100, 400, 500, 1400, and 1600. In some aspects, method 1800 is related to and performs similar functions to method 1700.

In 1810, method 1800 includes receiving a first TLV from a first node and a second TLV from a second node at a boundary node, both TLVs being tied to a duplicate service. The first node can be in a first network in the multi-area network and the second node can be in a second, different network in the multi-area network. The boundary node can be in the first second network.

In some aspects, operation 1810 is similar to operation 1710, except that two TLVs are received from different nodes in different networks. The second node can be an interior node 111 (e.g., interior node A 111A) in the second network 110 (e.g., network A 110A). The first node can be an interior node 111 (e.g., interior node D 111R) in a first network 110 separated from the second network 110 by at least one network boundary in the multi-area network. The duplicate service can be an identical service offered in two different networks 110 (e.g., the first network 110 and the second network 110).

In some aspects, both TLVs can be MAC learn TLVs. A MAC learn TLV can include a customer MAC address and a backbone MAC destination address (BMAC-DA). The MAC learn TLV can be associated with a service.

In 1820, the method 1800 includes determining whether the MAC address is present on the first node and the second node. This can be determined based on the MAC learn TLVs (e.g., checking whether the MAC learn TLV indicates that the MAC address is present), by querying the first or second networks 110 as to whether the MAC address is present on the first node or the second node, by looking at stored routes for the service (e.g., checking whether stored routes connect the service to the first node and the second node), or by referencing advertisements for the service in boundary nodes 117 or virtual nodes 116 (e.g., checking whether the service is advertised using the MAC address). Advertising a service can include offering the availability of a service from one or more networks, including based on the MAC address. In some aspects, if the source node for the MAC learn TLV is a virtual node 116, operation 1820 identifies that the virtual node 116 is not the node offering the service. In some aspects, determining whether the MAC address is present on a node can include referring to MAC table information for the respective network or querying the respective node directly.

In 1830, method 1800 selects the second node as the primary update source. In some aspects, the second node is selected based on a policy or protocol in place for handling priority in MAC synchronization according to different aspects disclosed herein. In some aspects, the second node is prioritized because it is in the same network as the boundary node. In some aspects, this can mean that the second TLV is more up-to-date because the second node is closer to the boundary node in the multi-area network. In some aspects, other rules or priorities can be used to select the primary update source. The primary update source can be used for both offerings of the service (meaning both the first and second nodes). For example, in some aspects, a duplicate service offered at two nodes forwarding through the boundary node can make use of the second node to reduce boundary crossings and reduce overall network load.

In aspects, where the MAC address is not present, method 1800 proceeds to operation 1840. If the MAC address is present, method 1800 can proceed to operation 1845.

In 1840, method 1800 adds a MAC address pointer to a MAC table based on the second TLV. The MAC address pointer can be a customer MAC address pointer. In some aspects, the customer MAC address pointer is a pointer with the customer MAC address pointing to the BMAC-DA for the service. The MAC table can be for boundary node 117 in the second network.

In 1845, method 1800 includes storing the first TLV and the second TLV in a TLV list. The TLV list can be used for keeping track of different TLVs for services. In some aspects, method 1800 stores any TLV received for a service in the TLV list, even if the TLV is not used to update the MAC table.

In 1850, method 1800 includes updating the local nodes based on the MAC table. In some aspects, this includes updating node MAC tables for other nodes in the second network. In some aspects, these can be any or all of interior nodes 111 and boundary nodes 117 in the second network. In some aspects, virtual nodes 116 in neighboring networks representing the second network can also have their MAC tables updated. Updating the MAC tables can include adding the customer MAC address pointer that was added in operation 1840 to the other MAC tables.

Figure 19:
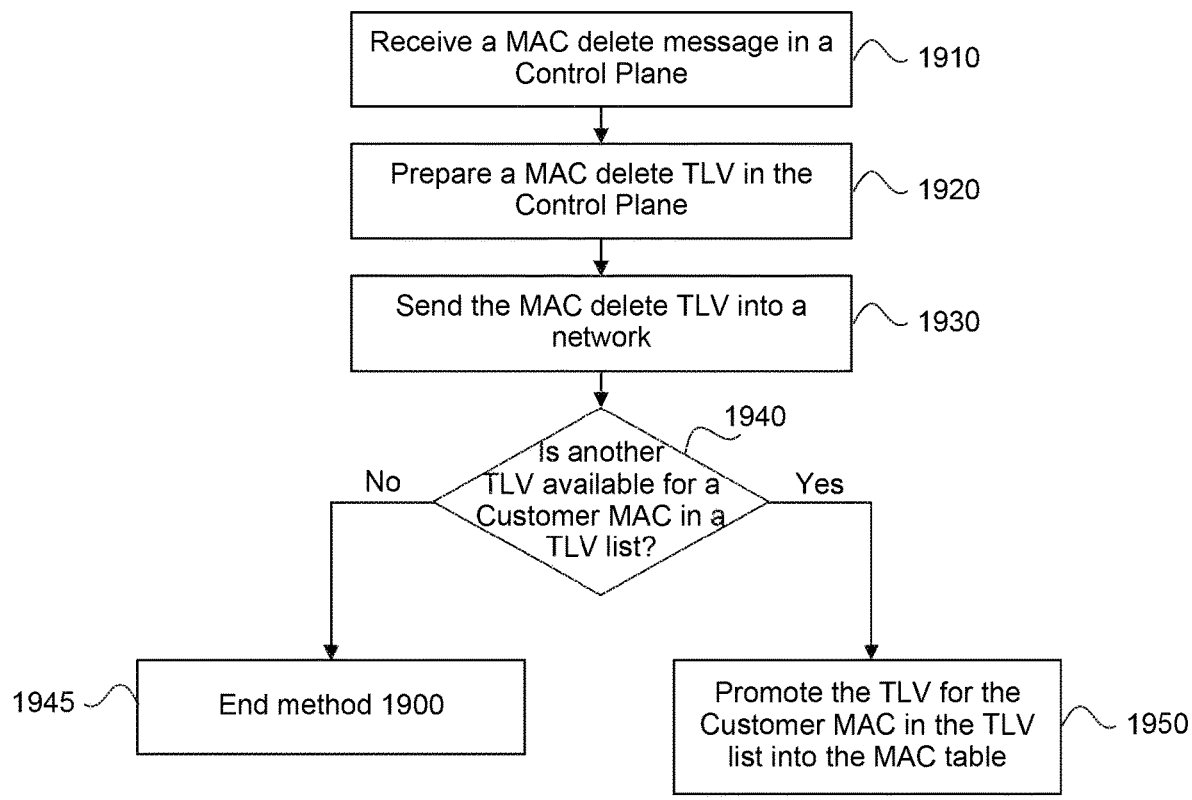
FIG. 19 is a flow chart illustrating a method for deleting learned MAC addresses in a multi-area network, according to some aspects.

FIG. 19 is a flow chart illustrating a method 1900 for deleting learned MAC addresses in a multi-area network, according to some aspects. In some aspects, the method 1900 can be employed in aspects of multi-area networks described herein, such as multi-area networks 100, 400, 500, 1500, and 1600. In some aspects, method 1900 is related to and can be combined with functions for methods 1700, 1800, 2000, and 2100 to provide deletion of learned MAC addresses for a multi-area network. In some aspects, method 1900 can be performed by the control plane system 200.

In 1910, method 1900 includes receiving, in the control plane 210, a MAC delete message. The MAC delete message can be the result of a learned MAC address stored in the MAC table, as described in methods 1700 and 1800, being stored longer than a predetermined time period. In some aspects, the predetermined time period can be an expiration or aging out time for a MAC address. The MAC delete message can be configured to cause the MAC address to be deleted from the MAC table.

In 1920, method 1900 includes preparing, in the control plane 210, a MAC delete TLV. This MAC delete TLV can include an identifier of the MAC address. The MAC delete TLV is configured to delete the MAC address from MAC tables. In some aspects, the MAC address is the customer MAC address pointer, as described in methods 1700 and 1800.

In 1930, method 1900 includes sending the MAC delete TLV into a network 110. The network 110 can be a network from the multi-area networks 230. In some aspects, operation 1930 can send the MAC delete TLVs into more than one network 110 at a time. The control plane 210 can send the MAC delete TLV to the network 110. In some aspects, the MAC delete TLV can be sent to nodes (e.g., boundary nodes 117) in the network 110 where the MAC address is present in the MAC tables. The nodes can delete the MAC address from the MAC tables upon receipt of the MAC delete TLV. In some aspects, operation 1930 deletes the MAC address from the datapath 220.

In 1940, method 1900 checks whether another TLV is available for a Customer MAC in TLV list. The boundary nodes 117 can perform operation 1940. If there is not, method 1900 goes to operation 1945. If there is, method 1900 goes to operation 1950.

In 1945, method 1900 ends. In this context, method 1900 has deleted the MAC using the control plane system 200 and method 1900 is complete.

In 1950, method 1900 promotes the TLV for the Customer MAC into the MAC table. The TLV for the MAC address can be a TLV stored in the TLV list during methods 1700 or 1800. In some aspects, the boundary nodes 117 can promote the TLV from the TLV list to the MAC table.

In some aspects, by storing TLVs in a TLV list, as described in methods 1700 and 1800, the multi-area network is able to maintain information from received TLVs, even when the TLV is not used to update the MAC table. Then, when MAC addresses expire, method 1900 can promote a TLV for a customer MAC as a replacement that is more recent. In some aspects, this can ensure that the MAC table has up-to-date information even after deleting MAC addresses.

Figure 20:
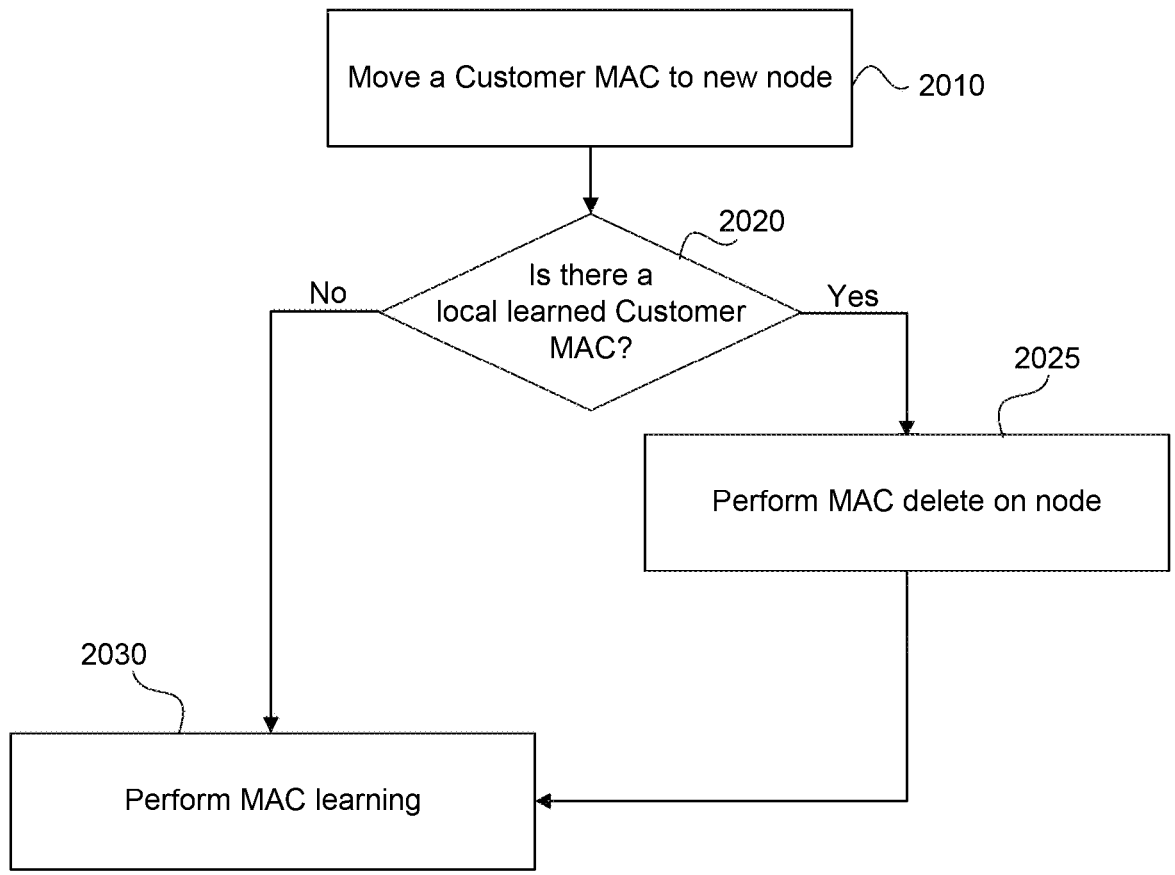
FIG. 20 is a flow chart illustrating a method for moving learned MAC addresses in a multi-area network, according to some aspects.

FIG. 20 is a flow chart illustrating a method 2000 for moving learned MAC addresses in a multi-area network, according to some aspects. In some aspects, the method 2000 can be employed in aspects of multi-area networks described herein, such as multi-area networks 100, 400, 500, 1400, and 1600. In some aspects, method 2000 is related to and can be combined with functions for methods 1700, 1800, 1900, and 2100 to provide moving of learned MAC addresses for a multi-area network. In some aspects, method 2-00 can be performed by control plane system 200.

In 2010, method 2000 includes moving a CMAC to new node. The CMAC can be a CMAC address pointer in a MAC table. The new node can be a new BMAC-DA for the CMAC address. The move can be performed by boundary node 117 or a by a command received from the control plane 210. In some aspects, operation 2010 does not actually perform the move, but rather is a trigger for the remainder of method 2000, which accomplishes the move.

In 2020, method 2000 includes checking whether there is a local learned CMAC. The check can be performed by boundary nodes 117. If there is, method 2000 goes to operation 2025. If there is not, method 2000 goes to operation 2030.

In 2025, method 2000 includes performing a MAC delete on a node (e.g., boundary node 117). In some aspects, the MAC delete performs operations 1910, 1920, and 1930 of method 1900. The node can be a node storing the Customer MAC in the MAC table. In some aspects, operation 2025 is triggered by operation 2010. Operation 2025 can be performed to delete the existing Customer MAC in the MAC table to make space for the new one. Operation 2025 can then proceed to operation 2030.

In 2030, method 2000 includes performing MAC learning. In some aspects, MAC learning is performing method 1700 for learning MAC addresses. In such aspects, the received TLV is the new node that the Customer MAC is being moved to.

In some aspects of method 2000, a MAC promotion is performed. In such aspects, the operations 1940 and 1950 of method 1900 are performed to promote an existing MAC address into the MAC table.

Figure 21:
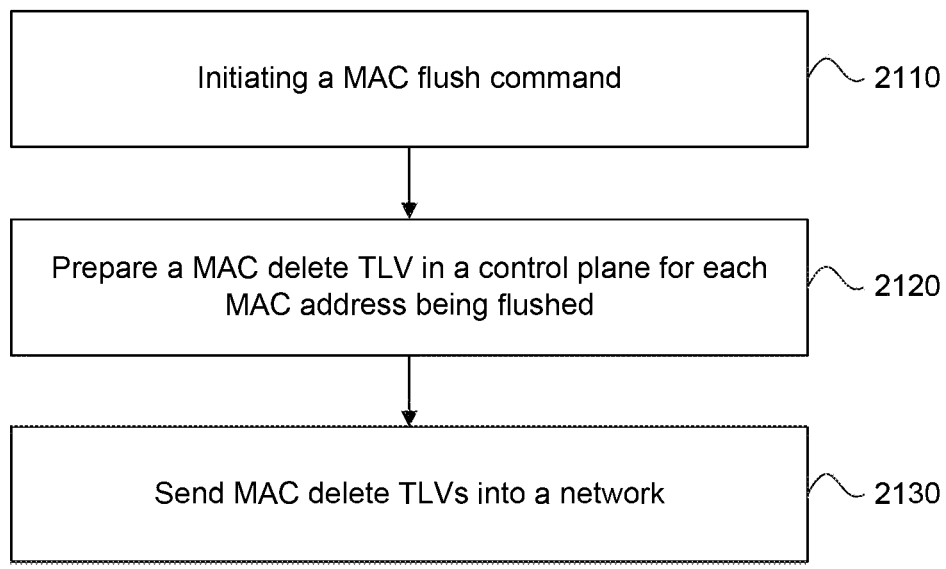
FIG. 21 is a flow chart illustrating a method for flushing learned MAC addresses, according to some aspects.

FIG. 21 is a flow chart illustrating a method 2100 for flushing learned MAC addresses, according to some aspects. In some aspects, method 2100 can be employed in aspects of multi-area networks described herein, such as multi-area networks 100, 400, 500, 1400, and 1600. In some aspects, method 2100 is related to and can be combined with functions for methods 1700, 1700, 1900 and 2000 to provide moving of learned MAC addresses for a multi-area network. In some aspects, method 2100 can be performed by the control plane system 200.

In 2110, method 2100 includes initiating a MAC flush command. The MAC flush command can be initiated by the control plane 210. In some aspects, the MAC flush command can include an I-SID for a service or a MAC address that needs to be removed from the MAC tables. In some aspects, the MAC flush command can be an all zeroes MAC address for flushing all of the MAC addresses in a MAC table. In some aspects, the control plane 210 can perform standard MAC flushing tasks in addition to method 2100 to remove the MAC address from the datapath 220.

In 2120, method 2100 includes preparing a MAC delete TLV in the control plane 210 for each MAC address being flushed. In some aspects, the MAC delete TLV can include the I-SID for the service and the customer MAC address that are being flushed. In some aspects, this operation differs from operation 1920 only in that more than one MAC delete TLV is prepared.

In 2130, method 2100 includes sending the MAC delete TLVs into a network 110. Operation 2130 can be performed according to operation 1830 as described in method 1900, but for one or more MAC delete TLVs. In some aspects, operation 2130 sends the MAC delete TLVs into more than one network 110.

Although some examples of the MAC synchronization are discussed with respect to a multi-area network, boundary node(s), and/or virtual node(s), the aspects of this disclosure are not limited to these examples. The MAC synchronization aspects of this disclosure can be applied to other networks, network node(s), and/or other cluster solutions.

Figure 22:
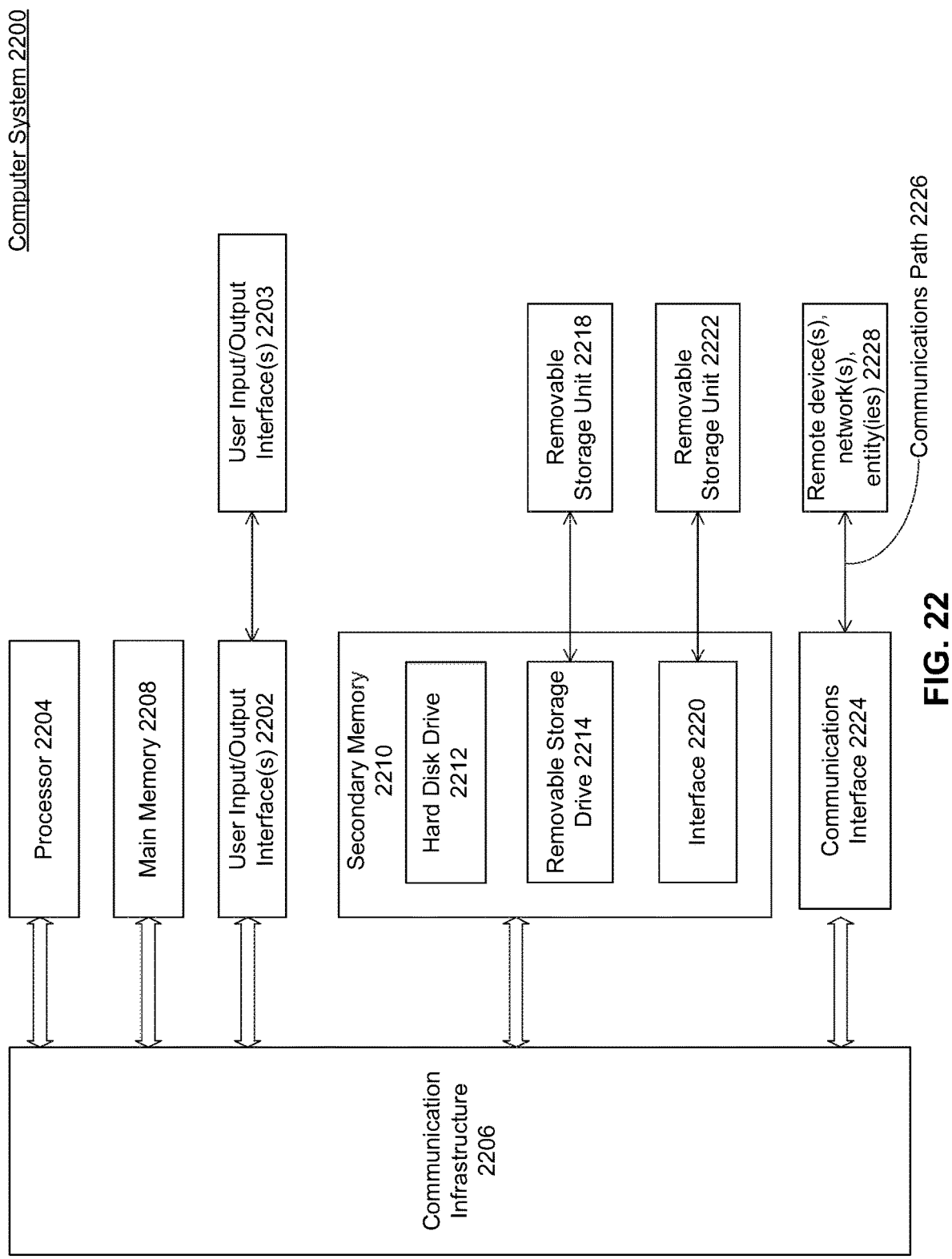
FIG. 22 illustrates a block diagram of a general-purpose computer that can be used to perform various aspects of the present disclosure, according to some aspects.

Various aspects can be implemented, for example, using one or more well-known computer systems, such as computer system 2200 shown in FIG. 22. One or more computer systems 2200 can be used, for example, to implement any aspect of the disclosure discussed herein, as well as combinations and sub-combinations thereof.

Computer system 2200 can include one or more processors (also called central processing units, or CPUs), such as a processor 2204. Processor 2204 can be connected to a communication infrastructure or bus 2206.

Computer system 2200 can also include customer input/output device(s) 2203, such as monitors, keyboards, pointing devices, etc., which can communicate with communication infrastructure 2206 through customer input/output interface(s) 2202.

One or more of processors 2204 can be a graphics processing unit (GPU). In an aspect, a GPU can be a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 2200 can also include a main or primary memory 2208, such as random access memory (RAM). Main memory 2208 can include one or more levels of cache. Main memory 2208 can have stored therein control logic (i.e., computer software) and/or data.

Computer system 2200 can also include one or more secondary storage devices or memory 2210. Secondary memory 2210 can include, for example, a hard disk drive 2212 and/or a removable storage device or drive 2214. Removable storage drive 2214 can be a floppy disk drive, a magnetic tape drive, a compact disk drive, an optical storage device, tape backup device, and/or any other storage device/drive.

Removable storage drive 2214 can interact with a removable storage unit 2218. Removable storage unit 2218 can include a computer usable or readable storage device having stored thereon computer software (control logic) and/or data. Removable storage unit 2218 can be a floppy disk, magnetic tape, compact disk, DVD, optical storage disk, and/any other computer data storage device. Removable storage drive 2214 can read from and/or write to removable storage unit 2218.

Secondary memory 2210 can include other means, devices, components, instrumentalities or other approaches for allowing computer programs and/or other instructions and/or data to be accessed by computer system 2200. Such means, devices, components, instrumentalities or other approaches can include, for example, a removable storage unit 2222 and an interface 2220. Examples of the removable storage unit 2222 and the interface 2220 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 2200 can further include a communication or network interface 2224. Communication interface 2224 can enable computer system 2200 to communicate and interact with any combination of external devices, external networks, external entities, etc. (individually and collectively referenced by reference number 2228). For example, communication interface 2224 can allow computer system 2200 to communicate with external or remote devices 2228 over communications path 2226, which can be wired and/or wireless (or a combination thereof), and which can include any combination of LANs, WANs, the Internet, etc. Control logic and/or data can be transmitted to and from computer system 2200 via communication path 2226.

Computer system 2200 can also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 2200 can be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 2200 can be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas can be used, either exclusively or in combination with known or open standards.

In some aspects, a tangible, non-transitory apparatus or article of manufacture including a tangible, non-transitory computer useable or readable medium having control logic (software) stored thereon can also be referred to herein as a computer program product or program storage device. This includes, but is not limited to, computer system 2200, main memory 2208, secondary memory 2210, and removable storage units 2218 and 2222, as well as tangible articles of manufacture embodying any combination of the foregoing. Such control logic, when executed by one or more data processing devices (such as computer system 2200), can cause such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 2. In particular, aspects can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary aspects of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the invention that others can, by applying knowledge within the skill of the art, readily modify and/or adapt for various applications such specific aspects, without undue experimentation, without departing from the general concept of the present invention. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary aspects, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method for providing multicast services across a boundary in a multi-area network, the method comprising:
receiving, at a boundary node, a multicast stream, wherein the multicast stream:
comprises a first service instance identifier (I-SID) and a first source node identifier corresponding to a source node in a first network,
satisfies a policy for redistribution from the first network across the boundary to a second network in the multi-area network, and
is being routed across the boundary,
wherein the boundary node is shared between the first network and the second network;
remapping, in the boundary node, the first source node identifier to a second source node identifier corresponding to a source node in the second network;
remapping, in the boundary node and based on other I-SIDs sent across the boundary node, the first I-SID to a second I-SID such that the second I-SID is different from the first I-SID and is different from the other I-SIDs sent across the boundary node;
receiving, at the boundary node, a second multicast stream comprising the first I-SID;
remapping, based on the other I-SIDs sent across the boundary node, the first I-SID to a third I-SID different from the first I-SID, the second I-SID, and the other I-SIDs sent across the boundary node;
forwarding, from the boundary node, the multicast stream having the second source node identifier and the second I-SID to the second network; and
forwarding, from the boundary node, the second multicast stream having the third I-SID to the second network.

2. The method of claim 1, further comprising installing, in the boundary node, a route for the multicast stream in a link-state database (LSDB), wherein the route is to a destination for the multicast service and is configured to satisfy the policy.

3. The method of claim 2, further comprising receiving, in the boundary node, the route, and wherein the route is installed in response to receiving the route.

4. The method of claim 1, wherein;
the second multicast stream:
further comprises a third source node identifier corresponding to a second source node in the first network,
satisfies the policy for redistribution from the first network across the boundary to the second network, and
is being routed across the boundary,
the method further comprises:
remapping, in the boundary node, the third source node identifier to the second source node identifier; and
the forwarding the second multicast stream comprises forwarding, from the boundary node, the second multicast stream having the second source node identifier and the third I-SID to the second network.

5. The method of claim 1, further comprising:
receiving, in the boundary node, a third multicast stream, wherein the third multicast stream:
comprises a fourth I-SID and a third source node identifier corresponding to a second source node in the first network,
satisfies the policy for redistribution from the first network across the boundary through the boundary node, and
is being routed across the boundary,
identifying, in the boundary node, that the multicast stream and the third multicast stream are from an identical multicast service; and
in response to the multicast stream and the third multicast stream being from the identical multicast service:
remapping, in the boundary node, the third source node identifier to the second source node identifier, and the fourth I-SID to the second I-SID; and
forwarding, from the boundary node, the third multicast stream having the second source node identifier and the second I-SID into the second network.

6. The method of claim 5, wherein the fourth I-SID and the first I-SID are identical.

7. The method of claim 5, further comprising receiving, in the boundary node, a message assigning the second I-SID to the multicast stream and the third multicast stream in the second network.

8. The method of claim 1, further comprising forwarding, from the boundary node, the multicast stream to the second network with a virtual node in the second network as an origin node, wherein the virtual node is configured to represent the first network.

9. A boundary node on a boundary between a first network and a second network in a multi-area network, the boundary node comprising:
a memory; and
a processor communicatively coupled to the memory and configured to:
receive a multicast stream, wherein the multicast stream:
comprises a first service instance identifier (I-SID) and a first source node identifier corresponding to a source node in the first network,
satisfies a policy for redistribution from the first network across the boundary to the second network, and
is being routed across the boundary,
remap the first source node identifier to a second source node identifier corresponding to a source node in the second network, wherein the source node in the second network is a virtual node;
remap, based on other I-SIDs sent across the boundary node, the first I-SID to a second I-SID such that the second I-SID is different from the first I-SID and is different from the other I-SIDs sent across the boundary node;
receive a second multicast stream comprising the first I-SID;
remap, based on the other I-SIDs sent across the boundary node, the first I-SID to a third I-SID different from the first I-SID, the second I-SID, and the other I-SIDs sent across the boundary node;

forward the multicast stream having the second source node identifier and the second I-SID to the second network; and forward the second multicast stream having the third I-SID to the second network.

10. The boundary node of claim 9, wherein the processor is further configured to install a route for the multicast stream in a link-state database (LSDB), wherein the route is to a destination for the multicast service and is configured to satisfy the policy.

11. The boundary node of claim 10, wherein the processor is further configured to receive the route, and wherein the route is installed in response to receiving the route.

12. The boundary node of claim 9, wherein;
the second multicast stream:
further comprises a third source node identifier corresponding to a second source node in the first network,
satisfies the policy for redistribution from the first network across the boundary to the second network, and
is being routed across the boundary,
the processor is further configured to remap the third source node identifier to the second source node identifier, and
to forward the second multicast stream, the processor is further configured to forward the second multicast stream having the second source node identifier and the third I-SID to the second network.

13. The boundary node of claim 9, wherein the processor is further configured to:
receive a third multicast stream, wherein the third multicast stream:
comprises a fourth I-SID and a third source node identifier corresponding to a second source node in the first network,
satisfies the policy for redistribution from the first network across the boundary through the boundary node, and
is being routed across the boundary,
identify that the multicast stream and the third multicast stream are from an identical multicast service; and
in response to the multicast stream and the third multicast stream being from the identical multicast service:
remap the third source node identifier to the second source node identifier, and the fourth I-SID to the second I-SID; and
forward the third multicast stream having the second source node identifier and the second I-SID into the second network.

14. The boundary node of claim 13, wherein the fourth I-SID and the first I-SID are identical.

15. The boundary node of claim 13, wherein the processor is further configured to receive a message assigning the second I-SID to the multicast stream and the third multicast stream in the second network.

16. The boundary node of claim 9, wherein the processor is further configured to forward the multicast stream to the second network with a virtual node in the second network as an origin node, wherein the virtual node is configured to represent the first network.

17. A non-transitory computer readable storage medium having computer readable code thereon, the non-transitory computer readable storage medium including instructions configured to cause a computer system to perform operations, comprising:
receiving a multicast stream at a boundary node between a first network and a second network in a multi-area network, wherein:
the multicast stream comprises a first service instance identifier (I-SID) and a first source node identifier corresponding to a source node in the first network,
the multicast stream satisfies a policy for redistribution from the first network across the boundary to the second network,
the first I-SID is configured to satisfy the policy for redistribution, and
the multicast stream is being routed across the boundary;
remapping the first source node identifier to a second source node identifier corresponding to a source node in the second network, wherein the source node in the second network is a virtual node;
remapping, in the boundary node and based on other I-SIDs sent across the boundary node, the first I-SID to a second I-SID such that the second I-SID is different from the first I-SID and is different from the other I-SIDs sent across the boundary node;
receiving, at the boundary node, a second multicast stream comprising the first I-SID;
remapping, based on the other I-SIDs sent across the boundary node, the first I-SID to a third I-SID different from the first I-SID, the second I-SID, and the other I-SIDs sent across the boundary node;
forwarding the multicast stream having the second source node identifier and the second I-SID from the boundary node to the second network; and
forwarding the second multicast stream having the third I-SID to the second network.

18. The non-transitory computer readable storage medium of claim 17, wherein;
the second multicast stream:
comprises a third source node identifier corresponding to a second source node in the first network,
satisfies the policy for redistribution from the first network across the boundary to the second network, and
is being routed across the boundary,
the operations further comprises:
remapping the third source node identifier to the second source node identifier; and
the forwarding the second multicast stream comprises forwarding the second multicast stream having the second source node identifier and the fourth third I-SID from the boundary node to the second network.

19. The method of claim 1, wherein the remapping the first I-SID to the second I-SID based on the other I-SIDs is based on a mapping of changes in the other I-SIDs and associated source node identifiers across the boundary node, and wherein the mapping is stored at the boundary node.

20. The boundary node of claim 9, wherein the remapping the first I-SID to the second I-SID based on the other I-SIDs is based on a mapping of changes in the other I-SIDs and associated source node identifiers across the boundary node, and wherein the mapping is stored at the boundary node.

* * * * *

UNITED STATES PATENT AND TRADEMARK OFFICE
CERTIFICATE OF CORRECTION

| | | |
|---|---|---|
| PATENT NO. | : 12,166,669 B2 | Page 1 of 1 |
| APPLICATION NO. | : 17/168954 | |
| DATED | : December 10, 2024 | |
| INVENTOR(S) | : Barcaru et al. | |

It is certified that error appears in the above-identified patent and that said Letters Patent is hereby corrected as shown below:

In the Claims

In Column 39, Claim 4, Line 56, delete "wherein;" and insert -- wherein: --, therefor.

In Column 41, Claim 12, Line 15, delete "wherein;" and insert -- wherein: --, therefor.

In Column 42, Claim 18, Line 37, delete "wherein;" and insert -- wherein: --, therefor.

In Column 42, Claim 18, Line 45, delete "comprises:" and insert -- comprise: --, therefor.

In Column 42, Claim 18, Line 50, before "third" delete "fourth".

Signed and Sealed this
Eleventh Day of March, 2025

Coke Morgan Stewart
*Acting Director of the United States Patent and Trademark Office*